United States Patent [19]

Drakopoulos et al.

[11] Patent Number: 5,506,848
[45] Date of Patent: Apr. 9, 1996

[54] DEMAND ASSIGNMENT SYSTEM AND METHOD FOR MOBILE USERS IN A COMMUNITY OF INTEREST

[75] Inventors: Elias Drakopoulos, Bartlett, Ill.; Diakoumis P. Gerakoulis, Dover, N.J.

[73] Assignee: AT&T Corp., Murray Hill, N.J.

[21] Appl. No.: 263,697

[22] Filed: Jun. 22, 1994

[51] Int. Cl.$^6$ ........................................ H04J 3/16
[52] U.S. Cl. ............................................ 370/95.1
[58] Field of Search .................. 370/95.1, 95.2, 370/95.3, 97, 77, 78, 79, 80, 81, 85.7, 94.1, 94.2, 84; 455/11.1, 13.1, 16

[56] References Cited

U.S. PATENT DOCUMENTS

| | | | |
|---|---|---|---|
| 4,491,947 | 1/1985 | Frank | 370/94.2 |
| 5,239,545 | 8/1993 | Buchholz | 370/95.3 |
| 5,365,590 | 11/1994 | Brame | 370/97 |

OTHER PUBLICATIONS

Bonuccelli, "A Fast Time Slot Assignment Algorithm for TDM Hierarchical Switching Systems", IEEE Transactions on Communications, vol. 37, No. 8, Aug. 1989.
Stern, "Design Issues Relevant to Developing an Integrated Voice/Data Mobile Radio System", IEEE Transactions on Vehicular Technology, vol. 39, No. 4, Nov. 1990.
Acampora et al., "A Metropolitan Area Radio System Using Scanning Pencil Beams", IEEE Transactions on Communications, vol. 39, No. 1, Jan. 1991.
Rose, "Rapid Optimal Scheduling for Time–Multiplex Switches Using a Cellular Automation", IEEE Transactions on Communication, vol. 37, No. 5, May 1989.
Inukai, "An Efficient SS/TDMA Time Slot Assignment Algorithm", IEEE Transactions on Communications, vol. COM–27, No. 10, Oct. 1979.
Sriram et al., "Discrete–Time Analysis of Integrated Voice/Data Multiplexes With and Without Speech Activity Detectors", IEEE Journal on Selected Areas in Communications, vol. SAC–1, No. 6, Dec. 1983.
Rose et al., "The Performance of Random and Optimal Scheduling in a Time–Multiplex Switch", IEEE Transactions on Communications, vol. COM–35, No. 8, Aug. 1987.

*Primary Examiner*—Melvin Marcelo
*Assistant Examiner*—Huy D. Vu

[57] ABSTRACT

A procedure for assigning time slots to mobile users in a wireless communication system supporting wireless communication applications where both end users of a communication link are mobile is discussed. The procedure operates by receiving time slot reservation requests from the mobile users during a first frame, wherein each of the time slot reservation requests comprises information identifying a source end user and a destination end user. During the first frame, a voice traffic matrix and a data traffic matrix are generated by using the time slot reservation requests. The voice traffic matrix comprises source end user information and destination end user information for all active voice calls, and the data traffic matrix comprises source end user and destination end user information for all pending data packets. Also during the first frame, time slot assignment information is generated based on the voice traffic matrix and the data traffic matrix. This time slot assignment information is then transmitted to the mobile users. The mobile users transmit and receive voice packets and data packets during time slots of a second frame as specified by the time slot assignment information.

17 Claims, 14 Drawing Sheets

$L_c$ : VOICE TIME SLOTS
$L_p$ : PACKET TIME SLOTS $T_o$ : ACTIVE CALLS
$T_a$ : NEWLY ARRIVED CALLS
$T_r$ : TERMINATED CALLS
$T_b$ : BLOCKED CALLS

*FIG. 7C*
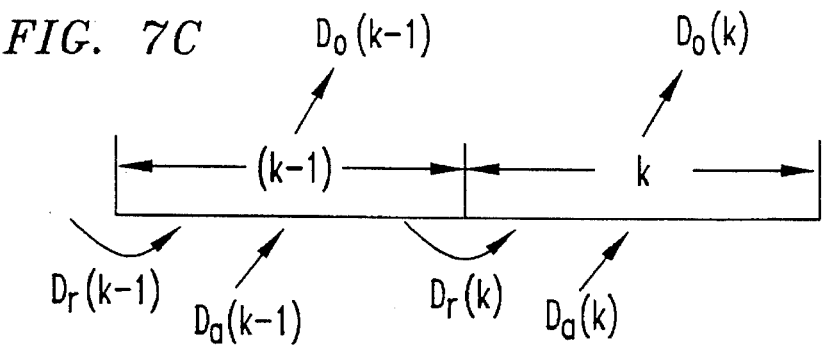
$D_a$ : NEW PACKET ARRIVALS
$D_r$ : PACKETS IN THE BUFFER TO BE SCHEDULED IN SUBSEQUENT FRAMES
$D_o$ : PACKETS SCHEDULED FOR TRANSMISSION
*FIG. 8A*
VOICE TRAFFIC MATRIX 802
$$T_0 = \begin{bmatrix} 0 & 2 & 1 \\ 1 & 1 & 1 \\ 1 & 0 & 0 \end{bmatrix} \begin{matrix} a' \\ b' \\ c' \end{matrix}$$
$a \quad b \quad c$ ← OUTPUT PORTS
↖ INPUT PORTS
$N=3 \; L_c=3 \; L=5$
*FIG. 8B*
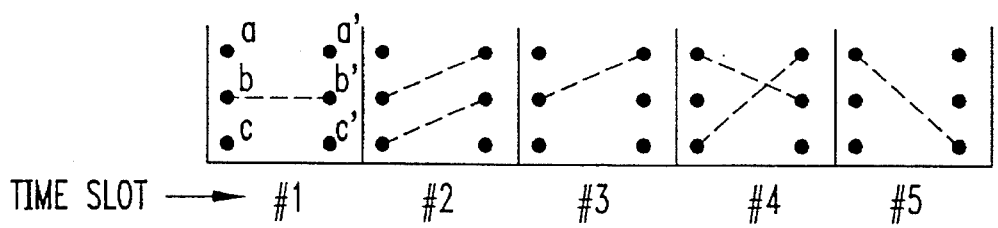
TIME SLOT → #1  #2  #3  #4  #5

FIG. 8C  INPUT FRAMES

|   | #1 | #2 | #3 | #4 | #5 |
|---|----|----|----|----|----|
| a |    |    |    | a-b' | a-c' |
| b | b-b' | b-a' | b-a' |    |    |
| c |    | c-b' |    | c-a' |    |

TIME SLOT

FIG. 8D  OUTPUT FRAMES

|    | #1 | #2 | #3 | #4 | #5 |
|----|----|----|----|----|----|
| a' |    | b-a' | b-a' | c-a' |    |
| b' | b-b' | c-b' |    | a-b' |    |
| c' |    |    |    |    | a-c' |

TIME SLOT

INPUT a → |    |    | ● | x | x |
OUTPUT b' → | x | x |    | x |    |
             | #1 | #2 | #3 | #4 | #5 |

AVAILABLE TIME SLOT (at #3)

FIG. 13A $$T_0 = \begin{bmatrix} 0 & 2 & 0 & 1 \\ 1 & 0 & 3 & 0 \\ 1 & 2 & 0 & 1 \\ 1 & 0 & 1 & 0 \end{bmatrix} \quad D_0 = \begin{bmatrix} 4 & 0 & 2 & 1 \\ 1 & 3 & 4 & 1 \\ 0 & 2 & 2 & 5 \\ 0 & 3 & 3 & 4 \end{bmatrix}$$

FIG. 13B $$D = \begin{bmatrix} 4 & 0 & (2) & 1 \\ (1) & 3 & 4 & 1 \\ 0 & (2) & 2 & 5 \\ 0 & 3 & 3 & (4) \end{bmatrix} \begin{matrix} -10 \\ -13 \\ -13 \\ -12 \end{matrix}$$
$$\begin{matrix} | & | & | & | \\ 8 & 12 & 15 & 13 \end{matrix} \leftarrow \bar{r}_i \atop \bar{\bar{c}}_j$$

$$\rightarrow \begin{bmatrix} (4) & 0 & 0 & 1 \\ 0 & (3) & 4 & 1 \\ 0 & 0 & 2 & (5) \\ 0 & 3 & (3) & 0 \end{bmatrix} \begin{matrix} -8 \\ -12 \\ -11 \\ -8 \end{matrix}$$
$$\begin{matrix} | & | & | & | \\ 7 & 10 & 13 & 9 \end{matrix}$$

$$\rightarrow \begin{bmatrix} 3 & 0 & 0 & 1 \\ 0 & 0 & 4 & 1 \\ 0 & 0 & (2) & 2 \\ 0 & 3 & 1 & 0 \end{bmatrix} \begin{matrix} -7 \\ -9 \\ -8 \\ -6 \end{matrix}$$
$$\begin{matrix} | & | & | & | \\ 6 & 7 & 11 & 6 \end{matrix}$$

$$\rightarrow \begin{bmatrix} 3 & 0 & 0 & 4 \\ 0 & 0 & (4) & 1 \\ 0 & 0 & 0 & 2 \\ 0 & 3 & 1 & 0 \end{bmatrix} \begin{matrix} -7 \\ -9 \\ -6 \\ -6 \end{matrix}$$
$$\begin{matrix} | & | & | & | \\ 6 & 7 & 9 & 6 \end{matrix}$$

$$\rightarrow \begin{bmatrix} (3) & 0 & 0 & 0 \\ 0 & 0 & 1 & 1 \\ 0 & 0 & 0 & 2 \\ 0 & (3) & 1 & 0 \end{bmatrix}$$

$$D_0 = \begin{bmatrix} 2 & 0 & 0 & 1 \\ 0 & 0 & 1 & 1 \\ 0 & 0 & 0 & 2 \\ 0 & 2 & 1 & 0 \end{bmatrix} \begin{matrix} -6 \\ -6 \\ -6 \\ -5 \end{matrix} \rightarrow$$
$$\begin{matrix} | & | & | & | \\ 5 & 6 & 6 & 6 \end{matrix}$$

DEMAND ASSIGNMENT SYSTEM AND METHOD FOR MOBILE USERS IN A COMMUNITY OF INTEREST

BACKGROUND OF THE INVENTION

1. Field of the Invention

The present invention relates generally to mobile communication systems, and more particularly to assigning channels and time slots upon demand in mobile communication systems.

2. Related Art

As the demand for mobile communications increases, future wireless systems will be required to provide services between mobile users that form communities of interest. A community of interest is considered to be any set of mobile users having frequent need to communicate directly with each other. Such communities of interest can be indoor and/or outdoor, formed by business and/or private users.

For example, more and more business applications require complete user mobility. These include office, factory, hospital, and emergency services, among others. In addition, as the mobile population of private users grows, it is very likely that such communities of interest of mobile users (at both ends of each wireless communication link) will form.

In order to support wireless communication applications where both end users are mobile, a wireless communication system must have flexible call assignment strategy and provide efficient user mobility management. The wireless system must have an efficient channel or time slot assignment procedure, provide high system throughput, and have fast handoff capability. In addition, the wireless system must have a switching system that is specifically designed to support the communication requirements associated with a self contained end user community (i.e., the majority of calls stay within the boundaries of the wireless system).

Conventional wireless communication systems do not provide these features. Accordingly, such conventional wireless communication systems do not adequately support wireless communication applications where both end users are mobile.

SUMMARY OF THE INVENTION

The present invention is directed to a high performance wireless system, and method employed therein, for interconnecting mobile users in a community of interest. More particularly, the present invention is directed to a system and method for assigning channels and time slots upon demand in a mobile communication system which supports wireless communication applications where both end users are mobile.

The system includes one or more radio exchange nodes (RENs), also called exchange nodes, each connected to a plurality of RF-distribution Points (RDPs). RF stands for radio frequency. Each exchange node includes switching equipment, a scheduling unit, a control unit, and a plurality of transceivers. The RDPs each provide antenna equipment.

The scheduling unit in each exchange node implements a scheduling algorithm to derive channel and time-slot assignments. This scheduling algorithm is designed to maximize utilization of system resources and optimize performance, such that the present invention achieves high throughput and low delays, and optimizes capacity distribution.

Each exchange node provides a continuous communication channel between each pair of end users. As a result, the present invention eliminates the need for processing of packet headers or packet buffering at the exchange node.

The present invention supports user applications requiring both voice and data services. The present invention achieves such support by integrating voice and data services, such that bandwidth is efficiently utilized and duplication of equipment is avoided. The present invention utilizes a "movable boundary" approach to integrate voice calls with data packets. The movable boundary approach permits the dynamic sharing of TDMA (time division multiple access) time-slots for different services. The present invention also extends such integration of services to both user access and switching equipment, i.e., the present invention provides integrated switching capability.

Thus, the present invention is directed to a system and method for assigning time slots to mobile users in a wireless communication system supporting wireless communication applications where both end users of a communication link are mobile. According to the present invention, time slot reservation requests are received at the REN from the mobile users during a first frame, wherein each of the time slot reservation requests comprises information identifying a source end user and a destination end user. During the first frame, a voice traffic matrix and a data traffic matrix are generated by using the time slot reservation requests. The voice traffic matrix comprises source end user information and destination end user information for all active voice calls, and the data traffic matrix comprises source end user and destination end user information for all pending data packets.

Also during the first frame, time slot assignment information is generated based on the voice traffic matrix and the data traffic matrix. This time slot assignment information is then transmitted to the mobile users. The mobile users transmit and receive voice packets and data packets during time slots of a second frame as specified by the time slot assignment information.

Further features and advantages of the present invention, as well as the structure and operation of various embodiments of the present invention, are described in detail below with reference to the accompanying drawings. In the drawings, like reference numbers indicate identical or functionally similar elements.

BRIEF DESCRIPTION OF THE FIGURES

The present invention will be described with reference to the accompanying drawings, wherein:

FIGS. 7A–7C are used to illustrate relationships pertaining to voice and data services;

FIGS. 8A–8F are used to describe traffic matrices and switch matrices;

FIGS. 13A–13D are used to describe scheduling algorithms used by the present invention.

DETAILED DESCRIPTION OF THE PREFERRED EMBODIMENTS

1. System Description

For illustrative purposes, the present invention is described herein with reference to a wireless communication system supporting wireless communication applications where both end users are mobile. It should be understood, however, that the features of the present invention as described herein are also applicable to other types of communication systems and other types of communication applications, such as non-wireless communication systems and applications.

Figure 1:
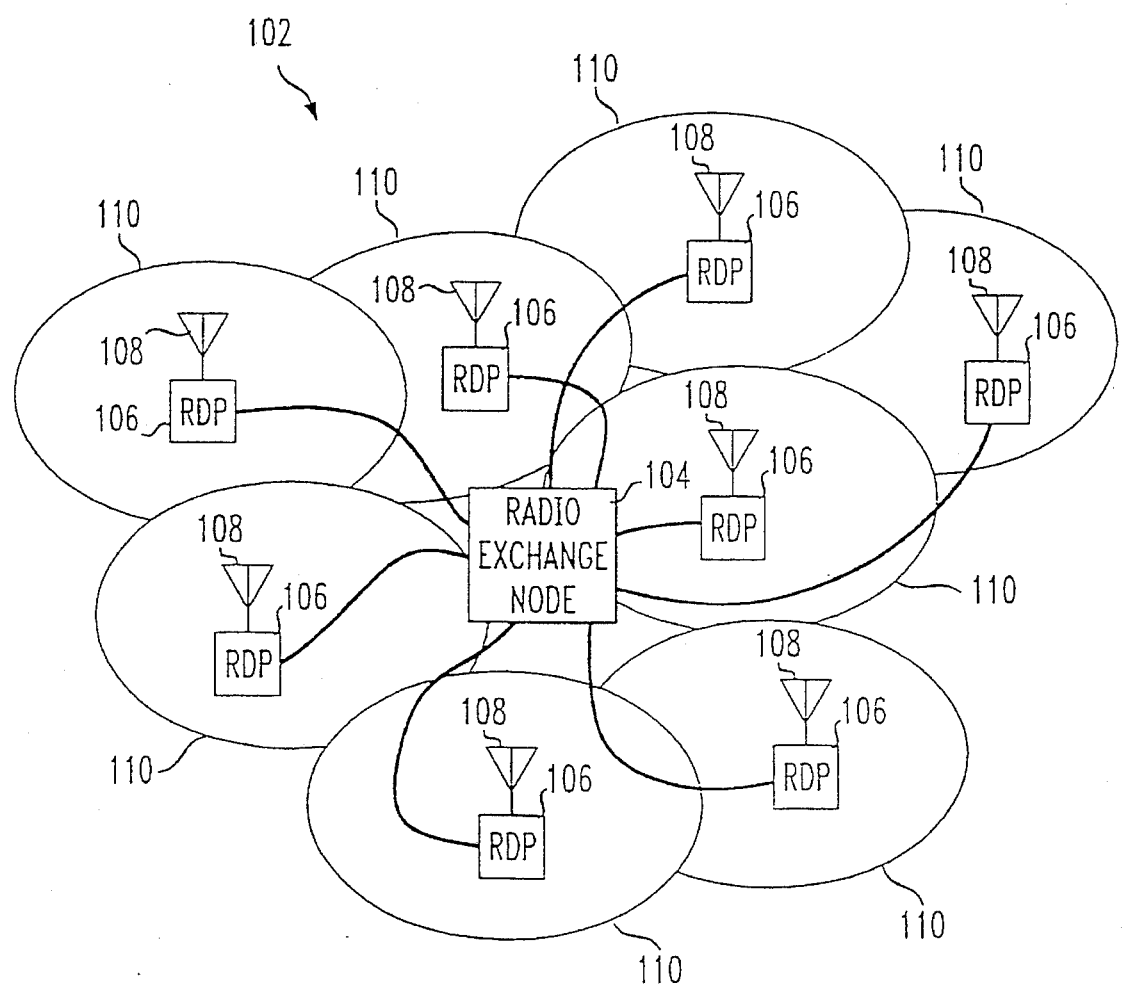
FIG. 1 is a block diagram of a wireless communication system according to a preferred embodiment of the present invention.

FIG. 1 illustrates a wireless communication system 102 according to a preferred embodiment of the present invention. The wireless system 102 includes a radio exchange node (REN) 104, or exchange node, connected to a number of RF-distribution points (RDPs) 106. The RDPs 106 are located in different geographical areas 110 or "cells". Each RDP 106 includes an antenna 108.

The wireless system 102 may alternatively include a plurality of radio exchange nodes 104. In the case of multiple RENs, a control path exists between the RENs so that calls may be scheduled and routed via one or more RENs. For ease of description, the wireless system 102 is described herein as having a single REN 104, as shown in FIG. 1.

Figure 2:
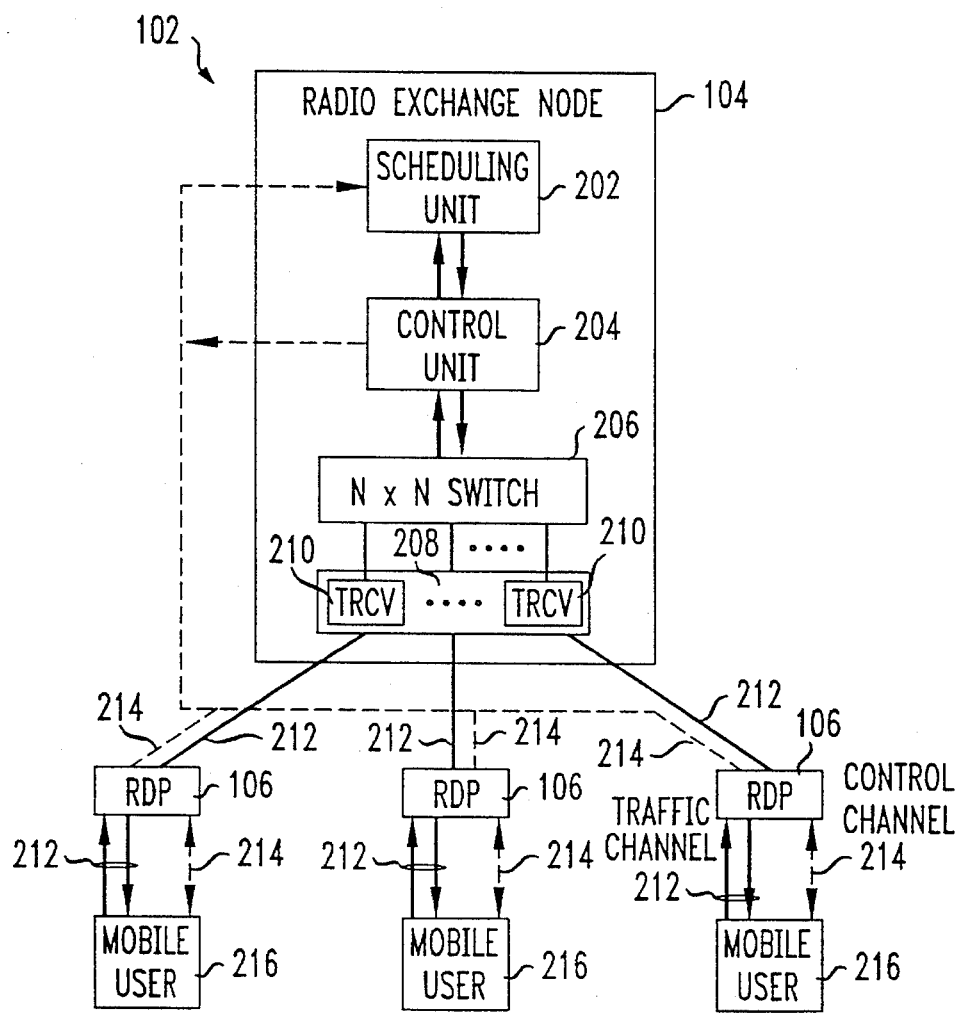
FIG. 2 is a block diagram of the present invention showing a radio exchange node in greater detail.

FIG. 2 is a block diagram of the wireless system 102 wherein the REN 104 is shown in greater detail. The REN 104 contains preferably N transceivers 210, a preferably NxN switch (preferably a time multiplexed switch, TMS), a control unit 204, and a scheduling unit 202. The RDPs 106 each contain only antenna equipment 108. The RDPs 106 preferably do not contain any intelligence, such as scheduling intelligence. Instead, such intelligence is contained in the REN 104. This is in contrast to conventional systems, where intelligence (and accompanying functionality) is found in both the REN and RDPs.

There are two basic types of channels between the mobile 216 and the REN 104, a traffic channel 212 and a control channel 214. The traffic channel 212 carries voice and data information between end mobile users 216 while the control channel 214 carries time slot requests and assignment messages between the mobile users and the REN 104.

Figure 3:
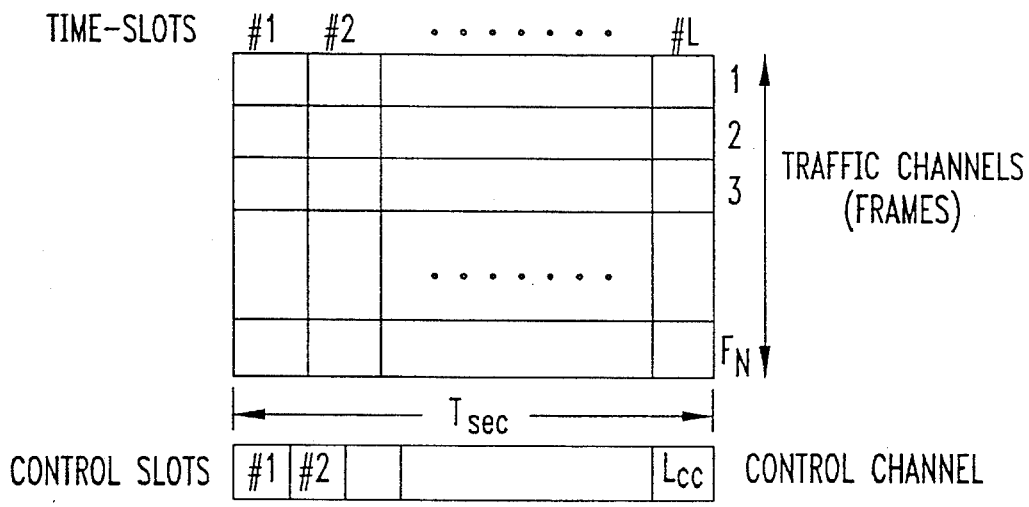
FIG. 3 illustrates traffic and control channels used by the present invention.

The wireless system 102 preferably utilizes an access method based on time division multiple access (TDMA) for the traffic channel 212. In particular, the wireless system 102 utilizes N radio frequency (RF) channels for uplink and N RF-channels for downlink, where each RF-channel provides L TDMA time-slots per frame (this is illustrated in FIG. 3). One or more RF-channels may be assigned to each RDP 106, although such assignments are made dynamically. That is, RF-channels can be transferred dynamically from one RDP 106 to another as the mobile population moves to different locations (i.e., cells 110).

The access method for the control channel 214 is considered in Section 3, below.

Figure 4A:
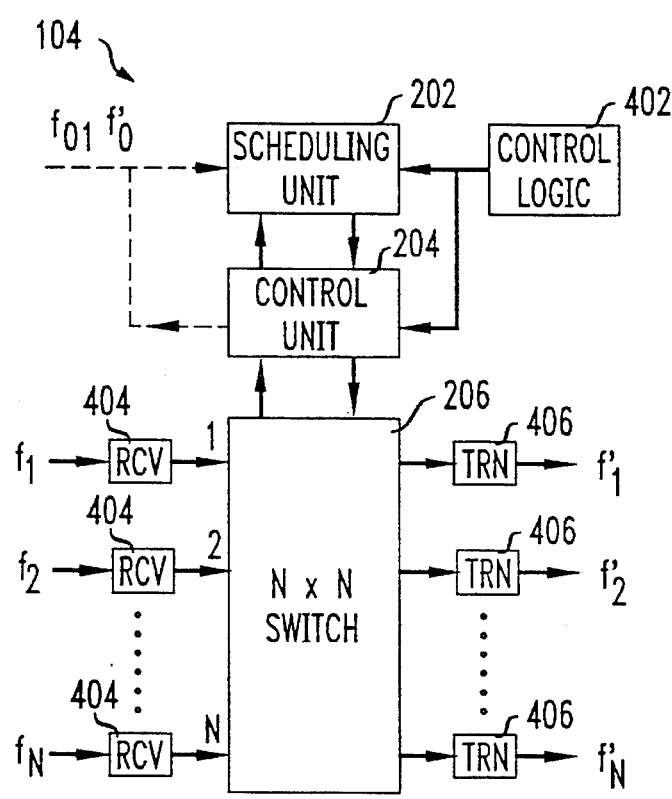
FIGS. 4A–4C are block diagrams of a radio exchange node according to embodiments of the present invention.
Figure 4B:
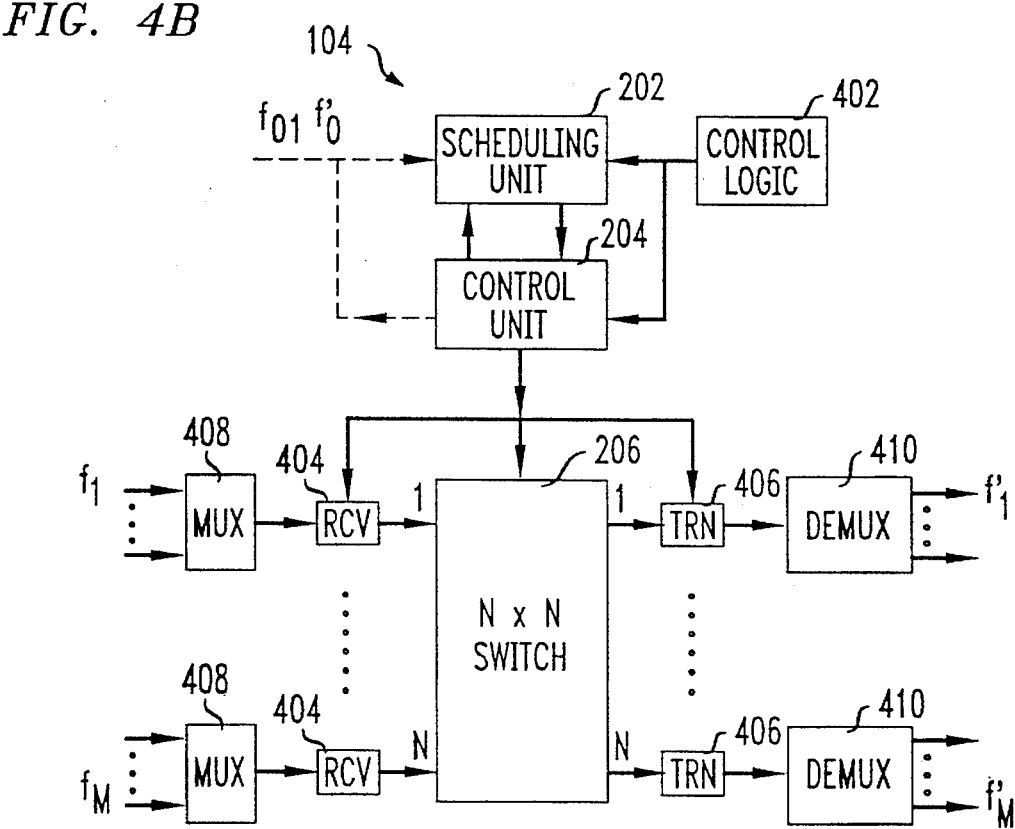
Figure 4C:
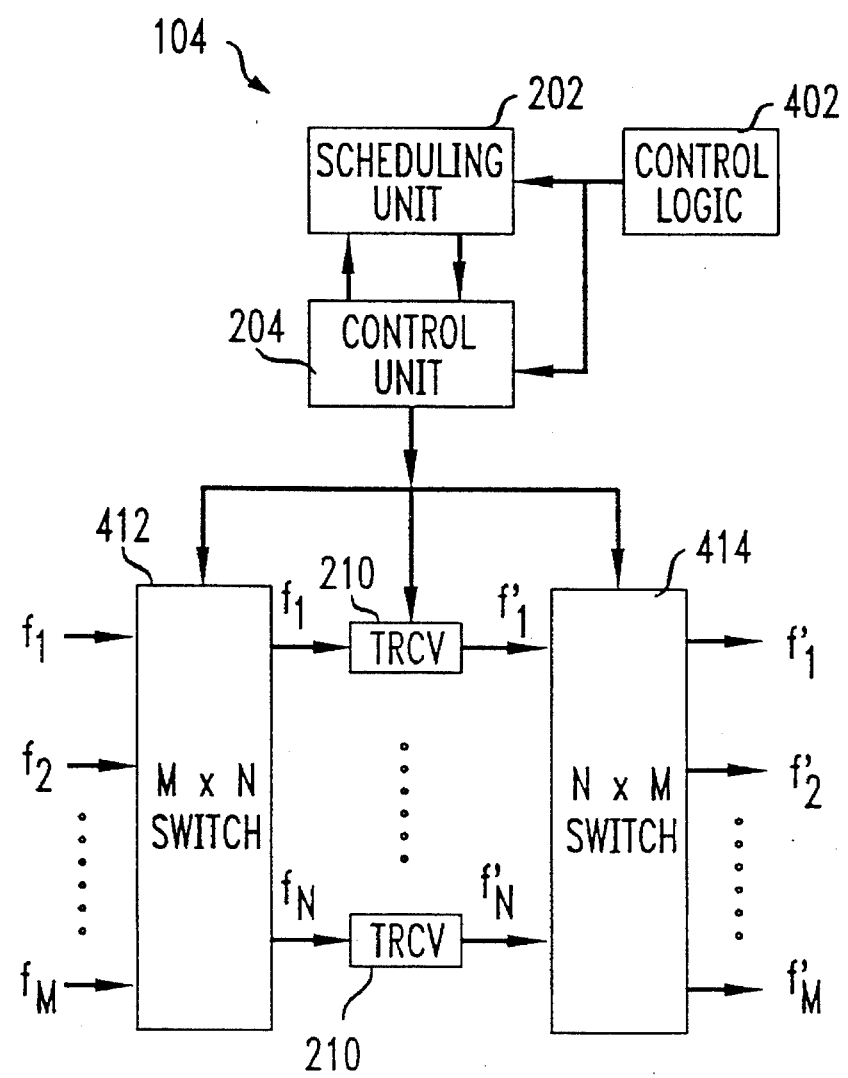

FIGS. 4A–4C are block diagrams of the exchange node 104 according to three embodiments of the present invention. The embodiment shown in FIG. 4A is adapted for use in situations where the number, M, of RF-channels is equal to the number, N, of transceivers 210. In this case, each transceiver 210 is assigned a single RF-channel.

Switching in the switch 206 takes place at either base band or at an immediate frequency (IF). Switching at IF may simplify transceiver hardware.

Note that each transceiver 210 includes a receiver (RCV) 404 and a transmitter (TRN) 406. Also note that the scheduling unit 202 and the control unit 204 operate in accordance with control logic 402. Such control logic 402 may represent computer software, such that the scheduling unit 202 and the control unit 204 (which may be implemented as a single processor or multiple processors) operate in accordance with instructions contained in the computer software. Alternatively, the scheduling unit 202, the control unit 204, and control logic 402 may collectively represent one or more hardware implemented state machines.

The embodiments shown in FIGS. 4B and 4C are adapted for use in situations where the number, N, of transceivers 210 is less than or equal to the number, M, of RF-channels, i.e., $M \geq N$. In the embodiments of FIGS. 4B and 4C, the control unit 204 causes the transceivers 210 (in particular, the receivers 404 and the transmitters 406) to tune to the appropriate RF-channel at each time-slot.

In the embodiment shown in FIG. 4B, multiplexers (MUXs) 408 are provided at the input of the receivers 404. The control unit 204 causes the multiplexers 408 to switch the appropriate signals to the receivers 404 at each time-slot, and also causes the receivers 404 to tune to the appropriate RF-channel at each time-slot. Also, de-multiplexers (DEMUXs) 410 are provided at the output of the transmitters 406. The control unit 204 causes the de-multiplexers 410 to switch the signals output from the transmitters 406 to the appropriate output lines at each time-slot, and also causes the transmitters 406 to tune to the appropriate RF-channel at each time-slot. The MUXs 408 and DEMUXs 410 provide modularity to the REN 104, permitting graceful expansion of the REN 104.

In the embodiment shown in FIG. 4C, the transceivers 210 perform frequency translation from the uplink carrier frequencies to the downlink carrier frequencies. An MxN switch 412 is provided to route the appropriate signals to the transceivers 210 during each time slot. An NxM switch 414 is provided to route the signals output by the transceivers 210 to the appropriate output lines during each time slot. The switches 412 and 414 are controlled by the control unit 204. The number, N, of transceivers 210 may vary as long as the following relationship is satisfied: $1 \leq N \leq M$. System capacity, however, is limited by the number, N, of transceivers 210.

Referring again to FIG. 2, mobile users 216 are connected to the RDPs 106 via an air interface. The RDPs 106 are connected to the REN 104 via the air interface, but may instead be connected via some other communication medium, such as fiber optic cables.

The air-interface comprises a traffic channel 212 and a control or demand channel 214. The traffic channel 212 carries voice and/or data information, while the control channel 214 carries reservation requests and time slot assignments. The REN 104 provides the capability for inter- and intra- RF-channel connectivity.

A demand assignment procedure is used to assign channels and timeslots to the mobile users 216. This approach utilizes a scheduling algorithm which enables the system 102 to maximize the utilization of transceivers 210, maximize channel throughput, and resolve switching conflicts.

The system 102 also integrates voice and data traffic by allocating a fixed number of time slots per frame for voice. The remaining slots are allocated for data packets. Hence, the mobile terminals 602 used by mobile users 216 provide voice and data services via a single interface.

Figure 6:
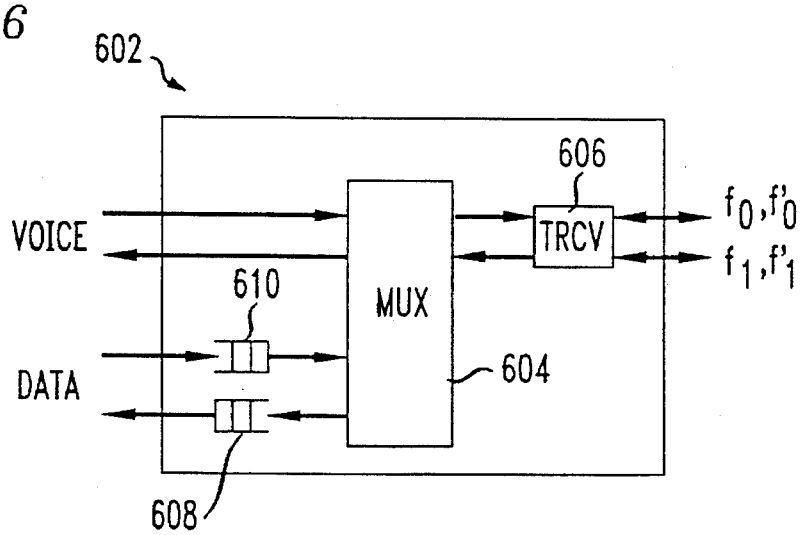
FIG. 6 is a block diagram of a mobile terminal according to the present invention.

FIG. 6 is a block diagram of a mobile terminal 602 according to an embodiment of the present invention. The mobile terminal 602 includes a multiplexer (MUX) 604 and a transceiver 606. The multiplexer 604 routes voice and data between voice processing circuitry (not shown) and data processing circuitry (not shown), respectively, and the transceiver 606. In this manner, the mobile terminal 602 integrates voice and data services. The mobile terminal 602 also includes a receive buffer 608 and a transmit buffer 610 for buffering data packets. It is important to note that, in the present invention, the mobile terminal 602 buffers only data packets (when necessary), not voice. Also, buffering (if any) is performed only at the mobile terminals 602. No buffering is performed at the RDPs 106 or the REN 104.

Figure 5:
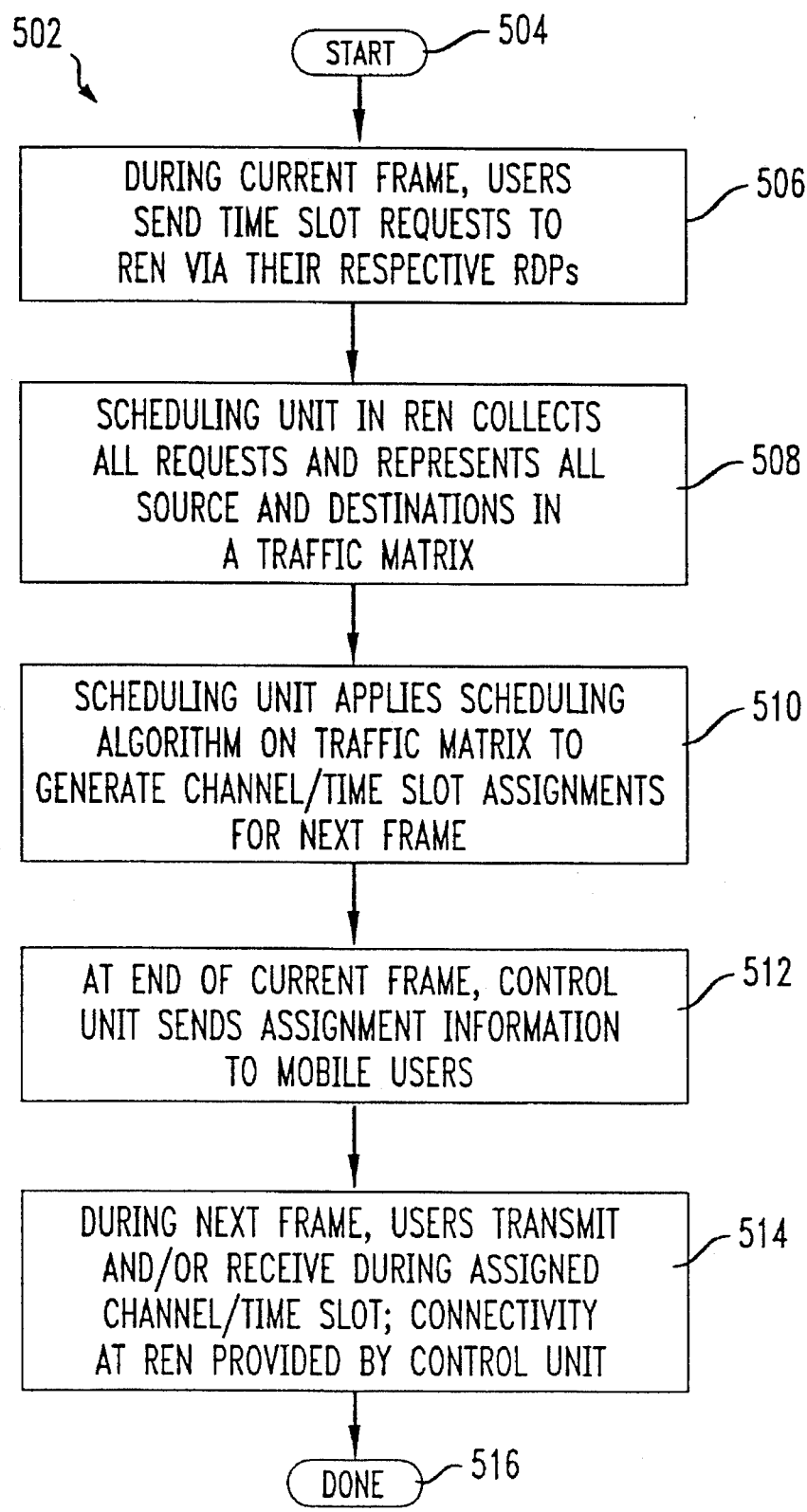
FIG. 5 is a flowchart representing a channel/time slot assignment process according to a preferred embodiment of the present invention.

The manner in which channels and time slots are assigned to mobile users 216 (i.e., mobile terminals 602) shall now be described with reference to a flowchart 502 in FIG. 5. As described in detail below, according to the present invention, time slots are assigned to mobile users 216 on a frame by frame basis. Thus, the steps of flowchart 502 are performed during each frame. Flowchart 502 begins with step 504, where control immediately passes to step 506.

In step 506, during a current frame (that is, the frame that is currently being processed), each mobile terminal 216 having a voice packet or a data packet to send prepares a reservation request. The reservation request preferably includes a location address of the source end user (that is, the mobile terminal 216 who is preparing the reservation request), a location address of the destination end user, and the type of service requested (voice or data). The mobile terminals 216 send these reservation requests to their respective RDPs 106 via the control channel 214. The RDPs 106 forward these reservation requests to the scheduling unit 202 in the REN 104.

In step 508, the scheduling unit 202 (operating in accordance with the control logic 402) collects and begins processing the reservation requests. During step 508, the scheduling unit 202 identifies newly arrived voice calls. A newly arrived voice call essentially represents a request from a mobile user 216 to establish a new voice call. Criteria which the scheduling unit 202 considers in determining whether to accept and establish a new voice call is described below. If a new voice call is not accepted, then the voice call is blocked. The present invention does not buffer voice packets pertaining to the blocked voice call.

According to the present invention, if a new voice call is established, then the voice call is guaranteed to be assigned a time slot in each frame (after establishment of the voice call) until the voice call is complete (i.e., terminates), although the time slot assigned to the mobile terminal 602 for the voice call may vary from one frame to another. Once a voice call has been established, it is not necessary for the mobile terminal 602 to send further reservation requests to the REN 104, unless there is a handoff from one RDP 106 to another. If there is a handoff, then the mobile terminal 602 must send a reservation request to the REN 104 to determine the entry in the voice traffic matrix (described below) corresponding to the new RDP 106 or RF-channel.

Also during step 508, the scheduling unit 202 creates a voice traffic matrix and a data traffic matrix. The voice traffic matrix includes source and destination information for all active voice calls. Specifically, the voice traffic matrix includes information that identifies the number of active calls between each source/destination pair. An example of a voice traffic matrix 802 is presented in FIG. 8A, described below.

The data traffic matrix includes source and destination information for all pending data packets. A data packet is pending if a request has been made to transmit it (that is, a reservation request has been sent to the scheduling unit 202), but it has yet to be scheduled for transmission. During step 508, the scheduling unit 202 identifies whether sufficient capacity exists to transmit all of the data packets represented in the data traffic matrix during the next frame (that is, the frame directly following the current frame). The manner in which the scheduling unit 202 performs this function is described below.

If sufficient capacity does not exist, then the scheduling unit 202 extracts packets from the data traffic matrix (actually, the scheduling unit 202 extracts the source/destination information pertaining to these packets) until the number of data packets represented in the data traffic matrix is equal to the number of data packets that can be transmitted during the next frame. The scheduling unit 202 stores the identities of such extracted data packets so that they can be scheduled in subsequent frames. It should be understood that the actual data packets are not sent to the REN 104 until they are scheduled for transmission. Until this time, the data packets are buffered in the mobile terminals 602.

In step 510, the scheduling unit 202 applies a scheduling algorithm using the voice and data traffic matrices to assign, for each active voice call and each data packet represented in the voice and data traffic matrices, respectively, a unique channel and time slot in the next frame.

In step 512, at the end of the current frame, the control unit 204 transmits the channel and time slot assignment information (determined in step 510) to the mobile users 216 via the control channel 212.

In step 514, during the next frame, the mobile users 216 (i.e., the mobile terminals 602) transmit and/or receive voice packets and/or data packets during their respective assigned channels and time slots. The control unit 204 controls the switch 206 and the transceivers 210 to ensure proper connectivity through the REN 104.

The time slots assigned during the current frame (in step 510) represent "direct channels" between mobile users 216 during the next frame (in step 514). This is the case since, during the next frame, these time slots are used to transfer voice packets and/or data packets between mobile users 216 without buffering, without processing packet headers, without voice encoding/decoding, and without other transmission delays at the exchange node 104.

Preferably, in step 510 an optimum scheduling algorithm is used such that system resources are optimally allocated, thereby maximizing total system throughput. To achieve this goal, the optimum scheduling algorithm may reassign time slots at the end of each frame for the duration of each voice call. Alternatively, other sub-optimum algorithms are used to achieve near-optimum results. Such sub-optimum algorithms involve less computational complexity and do not require the reassignment of time slots during a voice call, unless so requested by a mobile user 216. Two example scheduling algorithms are described below.

In an alternate embodiment, the system 102 employs voice activity detection circuitry (not shown) in order to achieve higher channel utilization. Generally, each voice source generates a series of talking periods (called "talkspurts") and silent gaps. An increase in the number of users in the system 102 can be achieved by permitting transmission only during the talking period of each voice user. That is, upon the arrival of a talkspurt, the mobile terminal 602 sends a reservation request to transmit the talkspurt. Talkspurts are transmitted as a sequence of voice packets with each voice packet having the length of a time slot. In the case where a slot is unavailable, the voice packet is discarded, resulting in speech clipping.

Preferably, each voice or data user may be assigned up to one time-slot per frame. That is, the frame duration is designed so that each speech source requires only one time-slot per frame. Data packets are assumed to be one time-slot long.

Reservation requests and assignment information messages are transmitted over a preferably low capacity control channel 214. The control channel 214 preferably utilizes a TDMA or random access-based uplink access method. The control channel 214 is designed so as to facilitate the implementation of a fast handoff process, which is desired since both end users are mobile.

In the present invention, upon the need of a handoff, the mobile user 216 sends a request to the scheduling unit 202 identifying the new RDP 106 or RF-channel (that is, the RDP 106 to handoff to). This request becomes a new entry in the traffic matrix. The scheduling unit 202 analyzes the new traffic matrix in view of the request and sends scheduling information to the mobiles at the end of the frame so that calls will be routed via the new RDPs 106. This process can take place at either end (source or destination). Also, this process can take place in each successive frame since the scheduling unit 202 performs the scheduling algorithm in every frame. This results in a fast handoff process. In addition, the handoff process is initiated or controlled by the mobile since it is the mobile that sends the requests.

As mentioned above, the system 102 may include multiple RENs 104, wherein control and traffic channels are established between the RENs 104. Routing traffic to and from other networks (i.e., a public telephone network or a data network) is also possible by providing the appropriate interface to a number of time multiplexed switched (TMS) ports.

2. Channel and Time Slot Scheduling Algorithms

The scheduling algorithm used by the present invention to generate channel and time slot assignments is described in this section.

Generally, a scheduling algorithm must be provided with the following information in order to operate: (1) the available resources allocated for voice service; (2) the available resources allocated for data service; and (3) whether buffering is permitted for voice and/or data service.

The present invention employs a moveable boundary approach wherein a fixed number of time slots in each frame are assigned for voice (but can be used for data packets if not being used for voice), and the remaining slots are assigned for data (these slots cannot be used for voice). Thus, according to the present invention, the available resources allocated for voice service is equal to the number of time slots in each frame assigned for voice according to the moveable boundary approach. The available resources allocated for data service is equal to the number of time slots in each frame not assigned for voice according to the moveable boundary approach, plus the number of voice slots which are not being used for voice.

Preferably, the present invention utilizes flames having a fixed length. This is in contrast to conventional systems, which utilize variable length flames. Also, the present invention guarantees that once a voice call is established, the voice call will be assigned a time slot in each frame until the voice call completes (i.e., voice service is guaranteed). Thus, according to the present invention, voice packets are not buffered in the system 102. Also, it is not necessary to transmit all pending data packets during each frame (i.e., it is not necessary to exhaust all pending data packets). Data packets which are not transmitted are buffered in the mobile terminals 216.

Any scheduling algorithm capable of supporting the above characteristics of the present invention (fixed length frame, movable boundary, buffering not allowed for voice, buffering allowed for data, etc.) may be used in the present invention. The actual scheduling algorithm used may be optimum, sub-optimum, or random, for example. The functionality and operation of the scheduling algorithm is embedded in the control logic 402. The scheduling unit 202 operates in accordance with the control logic 402 to perform the scheduling algorithm selected for use with the system 102.

The system 104 may be easily configured to operate using any particular scheduling algorithm by appropriate modification of the control logic 402 (the manner in which control logic 402 may be modified to implement a particular scheduling algorithm will be apparent to persons skilled in the art). In fact, this represents an advantage of the present invention, in that the scheduling algorithm can be easily changed to adjust for changing performance requirements and changing system configurations and loads.

Two scheduling algorithms that may be used by the present invention are described below. These are called Frame Scheduling Algorithm 1 (FSA1) and Frame Scheduling Algorithm 2 (FSA2). FSA1 is an optimum approach and allows a maximum number of voice calls and data packets to be scheduled within a frame, but at the cost of increased computational complexity. FSA2 is a suboptimum approach, and allows scheduling of packets without reassignment of voice time-slots, and has reduced complexity. Both FSA1 and FSA2 are designed for scheduling frames of fixed lengths. As discussed above, all conventional scheduling algorithms known by the inventors operate with variable length frames.

In describing FSA1 and FSA2, the following terms are used. Given a traffic matrix D and a line in any row or column of the matrix D, Line Sum is the sum of the entries in the line, and the Maximum Line Sum of a matrix D, Z(D), is defined by $Z(D)=\max(r_1, r_2, \ldots, r_N, C_1, C_2, \ldots, C_N)$; where $r_1, r_2, \ldots, r_N$ and $C_1, C_2, \ldots, C_N$ are the row and column sums of the matrix D respectively. Critical Line is any line with maximum line sum. A traffic matrix D may be considered as the adjacency matrix of a bipartite graph $G_p$ (V, U, E) with each nonzero entry $d_{ij}$ in D representing an edge $e_{ij} \in V$ and $u_j \in U$. A Switching matrix, $T_S$, is a matrix having at most one entry per line, and thus may be considered as the adjacency of a matched bipartite graph $G_S$.

The duration of a switching configuration is equal to the maximum entry in $D_S$, denoted by $|D_S|$. Cardinality of a switching matrix $D_S$, denoted by $||D_S||$, is the number of nonzero entries in $D_S$. The Transmission time z(d), of a schedule $$D = \sum_{s=1}^{S} D_s,$$

is the sum of the switching durations, i.e., $$z(D) = \sum_{s=1}^{S} |D_s|.$$

Note that $Z(D) \leq z(D)$. A scheduling algorithm which always generates transmission time $z(D)=Z(D)$ is said to be optimum.

2.1 FSA1: Optimal Approach

FSA1 is applied on matrices $T_O$ of active voice calls and D of total packet traffic. It is assumed that matrix $T_S$ has been updated (prior to applying FSA1) by adding the entries corresponding to the newly accepted calls or by subtracting the ones corresponding to terminal calls. A new call is accepted if scheduling conditions (2-a, 2-b), described below, are satisfied; otherwise the call is blocked. The matrix D of the total data traffic is subject to scheduling conditions (4-a, 4-b), described below. For this reason, FSA1 is performed in two steps:

Step I: If $Z(D+T_O)>L$ then Procedure I (described below) is performed to thereby provide matrix $D_O$ by extracting a minimum number of entries from D, so that $Z(D_O+T_O)=L$. If $Z(D_O+T_2) \leq L$ then set $D_O=D$.

Step II: An optimum algorithm is performed on matrix $(D_O+ T_O)$ in order to schedule all traffic of voice and data within a frame of length L.

2.1.1 Procedure I Used With FSA1

Let $\bar{r}_i$, $\bar{c}_j$ denote the row and column sums of matrix $D_O+T_O=[d_{ij}+ t_{ij}]$. Procedure I, which is used with FSA1 as described above, operates as follows:

Step 1: Consider all entries $d_{ij}>0$ in D having both $\bar{r}_i$, $\bar{c}_j> L$. Let these entries form a bipartite graph $G_p$ (V, U,E). If there are no such entries, go to Step 3 of Procedure I.

Step 2A: For each edge $e_{ij}$ in $G_p$, assign a weight as follows:

$$W_{ij}=M-\min\{(\bar{r}_i-L), (\bar{c}_j-L)\}$$

where M is a number large enough so that all weights are positive.

Step 2B. Find a maximum weight matching in $G_p$ (V, U,E) using any applicable and appropriate $O(n^3)$ algorithm, such as that provided in E.L. Lawler, *Combinatorial Optimization: Networks and Matroids*, N.Y., Holt, Rinehart and Winston, 1976, which is herein incorporated by reference in its entirety. The algorithm employed in this step 2B provides a matched of the bypartite graph in which the total weight assigned to its edges is maximized.

Step 2C: Replace all entries $d_{ij}$ in D corresponding to the matching found in Step 2B of Procedure I, with new ones as follows:

$$d_{ij} \leftarrow d_{ij} - \min\{(\bar{r}_i-L), (\bar{c}_j-L), d_{ij}\}$$

Evaluate new $\bar{r}_i$s and $\bar{c}_j$s. If all $\bar{r}_i$, $\bar{c}_j \leq L$, go to Step 4 of Procedure I. Otherwise, go to Step 1 of Procedure I.

Step 3: Find all rows or columns with $\bar{r}_i$ and $\bar{c}_j>L$. If there are none, go to Step 4 of Procedure I. Otherwise, choose on each of these rows or columns an entry $d_{ij}>0$ and replace it with a new one as follows:

$$d_{ij} \leftarrow d_{ij} - \min\{(\bar{r}_i-L), d_{ij}\}, \text{ if it is a row.}$$

$$d_{ij} \leftarrow d_{ij} - \min\{(\bar{c}_j-L), d_{ij}\}, \text{ if it is a column.}$$

Find the new $\bar{r}_i$s and $\bar{c}_j$s and repeat Step 3 of Procedure I.

Step 4: Set $D_O=D$. Stop and return to FSA1 (that is, Procedure I is complete).

2.1.2 Optimal Algorithm Used With FSA1

In Step II of FSA1, an optimum algorithm is applied on the matrix $(T_O +D_O)$ which generates a transmission schedule $Z(T_o+D_O)= L$. This optimum algorithm is described in this section.

Step 1: Set $1 \leftarrow s$ and $\bar{T}(0) \leftarrow T_o+D_O$

Step 2: Find a switching matrix $\bar{T}_s$ with maximum cardinality which also covers all critical lines in the matrix $\bar{T}(s)$. Preferably, matrix $\bar{T}_S$ can be found by using any well known maximum weight matching algorithm, such as that described in E.L. Lawler, *Combinatorial Optimization: Networks and Matroids*, cited above. The assigned weight on each edge $e_{ij}$ of the bipartite graph, adjacency of which is matrix $\bar{T}(s)$, should be $(1+M\delta)$, where $\delta$ is equal to the number of critical lines covered by the corresponding entry in $\bar{T}(S)$, i.e. $\delta=0$, 1, or 2.

Set 3: Set $\bar{T}(s) \leftarrow \bar{T}(s-1)-T_s$. If $\bar{T}(s)=0$, Stop and return to FSA1 (that is, the optimum algorithm applied in Step II of FSA1 is complete). Otherwise, go to Step 2 of this optimum algorithm.

2.1.3 Comments on FSA1

FSA1 achieves optimum or at least near optimum results. This is the case for the reasons provided below.

Step II of FSA1 always achieves its goal since Procedure I used in Step I of FSA1 extracts a number of entries from D that reduces the maximum line sum of $(D+T_o)$ to L. This number is as small as possible for the following reason: Steps 1 and 2 of Procedure I iterate until all lines in the line sum (ls) that are greater than L, have no common entries. This is done for the purpose of minimizing the traffic extracted in Step 3 of Procedure I, since any entry extracted from a line with ls>L will further reduce the ls of a crossline which already has $ls \leq L$. In addition, the entries extracted in Steps 1 and 2 (before entering Step 3) of Procedure I are minimum. This is achieved by finding a maximum weight matching, in Steps 2A and 2B of Procedure I, wherein the excess traffic, $\min\{(\bar{r}_i-L), (\bar{c}_j-L)\}$, extracted at each iteration is a minimum.

The complexity of Procedure I is proportional to $O(n^3)$ where $n \leq N$ at each iteration of Step 1 of Procedure I. Step II of FSA1 has complexity bounded by $O(SN^3)$, where S is the number of switching matrices.

$$T_O + D_O = \sum_{s=1}^{S} [T_s + D_s] = \sum_{l=1}^{L} [T_l + D_l], \quad S \leq L$$

Each switching matrix may have the duration of one or more time slots, $$x = |T_s + D_s|, T_s + D_s = \sum_{l=1}^{x} [T_l + D_l]$$

2.2 FSA2: Sub-Optimal Approach

FSA2 assumes that the time-slots for voice calls have already been scheduled. This schedule for voice calls is preferably obtained using any well known random scheduling procedure (although any other well known scheduling algorithm may alternatively be used). Hence, given $$T_o = \sum_{l=1}^{L} T_l,$$

FSA2 provides a schedule for packet time-slots on a frame-by-frame basis as follows:

Step 1: Set frame time-slots $l=1,2, \ldots L$ in order of increasing cordinality of $T_l$, i.e., $\|T_l\| \leq \|T_{l+1}\|$ with $\|T_1\| \geq 0$. Set $1 \leftarrow 1$ and $D(O) \leftarrow D$.

Step 2A: For each nonzero entry $t_{ij}$ in $T_l$, set all entries in row i and column j to zero in D(l), to form matrix D'(l).

Step 2B: Apply any well known matching algorithm on matrix D'(l), to find a switching matrix $D_l$ of the maximum cordinality.

Step 3: Set $D(l) \leftarrow D(l-1)-D_l$. If l=L, stop (that is, FSA2 is complete). Otherwise, go to Step 2 of FSA2.

The complexity of FSA2 is bounded by $O(Ln^{2.5})$, where n≤L. The complexity of the matching algorithm used in Step 2B is bounded by $O(n^{2.5})$).

FSA2 may also achieve near optimum results. The reason is that, since the matching algorithm is Step 2B always generates a schedule in non-increasing order of cordinality, and since FSA2 starts at a time-slot with minimum cordinality $T_l$, most of the traffic in D is scheduled at the first few iterations. In the example described in the next section, the total data packets scheduled under FSA2 is 9, while that under FSA1 is 10.

2.3 Examples of FSA1 and FSA2

Examples of FSA1 and FSA2 are presented in this section. For these examples, assume that traffic matrices $T_O$ and $D_O$ are as shown in FIG. 13A. Also assume that L=6, $L_c$=4, and $L_p$=2.

2.3.1 FSA1 Example

According to FSA1, $D_0$ is generated from D as shown in FIG. 13B. The total traffic in $D_0$ is $t_0$=10. By applying Step II of FSA1, $T_0+D_0$ are transmitted within L=6.

2.3.2 FSA2 Example

Figure 13C:
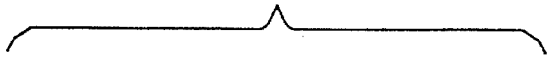
Figure 13D:

Assume that the frame schedule for $T_0$ in increasing order of cardinality l=1,2 . . . , 5 is as shown in FIG. 13C. Applying Steps 2 and 3 of FSA2 for each time-slot l=1,2, . . . , 5, the final schedules of both voice and data are as shown in FIG. 13D, wherein the entries in parenthesis represent voice. The total data packets in this case is $t_0$=9, compared with $t_0$=10 for the FSA1 example.

3. Control Channel Access and Handoff Algorithm

The control channel 214 is preferably a low capacity channel which carries reservation requests (from the mobile users 216 to the REN 104) and channel/time slot assignment messages (from the REN 104 to the mobile users 216). Its access method in the uplink direction (from the mobile users 216 to the REN 104) is preferably either TDMA (time division multiple access) or random access, such as Aloha, which are well known to persons skilled in the relevant art.

The system 102 employs and implements a handoff procedure to enable a mobile user 216 to "handoff" from one RDP 106 to another RDP 106 as the a mobile user 216 traverses among the cells 110. It should be understood that any well known handoff procedure may be used in the system 102 of the present invention. However, by using a random access method on the uplink side of the control channel 214, such as the well known Aloha or Reservation Aloha access method, it is possible to achieve a handoff process controlled by the mobile. Thus, preferably, each mobile user 216 directly accesses the next or new RDP 106 for the purpose of handing off to it (in other words, the handoff process is driven and controlled by the mobile users 216).

On the other hand, the use of a random access method may result in excessive message delay when the traffic load on the control channel 214 is high. The number of messages transferred over the control channel 214 on the uplink side will be particularly significant if the system 102 utilizes voice activity detection in which case a reservation request is sent at each talkspurt arrival.

4. System Modeling and Analysis

System modeling and analysis of the system architecture and operation described above is presented in this section. Additional details pertaining to the structure and operation of the present invention are also provided in this section. The analysis provided in this section is performed under the assumption that the optimum scheduling algorithm (FSA1), described above, is used. This analysis considers the case where M is equal to N, as represented in FIG. 4A.

Figure 7A:
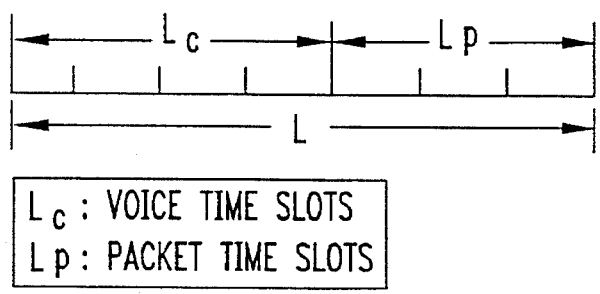

The system model operates on a frame-by-frame basis. Each frame has a fixed length of L time slots. The present invention employs a moveable boundary approach wherein a fixed percentage of time slots in each frame is designated for voice calls. Time slots not designated for voice are reserved for data packets only. Any unused voice slots can be assigned temporarily for packets. Data packets cannot be used for voice calls. FIG. 7A shows a frame of L time slots from which $L_c$ time slots are reserved for voice calls and $L_p$ time slots are reserved for data packets.

During each frame, mobile users 216 send reservation requests via the control channel 214 to the scheduling unit 202 for voice calls or data packets. The scheduling unit 202 forms traffic matrices $T_a(k-1)$ and $D_a(k-1)$ of voice and data requests respectively, arrived during a current frame (k-1). The scheduling unit 202 also maintains a matrix $T_o(k-1)$ of active call connections. It also maintains a matrix $D_r(k-1)$ containing information pertaining to unscheduled data packets from previous frames, which are waiting to be scheduled in subsequent frames.

Based on the above data, $T_a$, $D_a$, $T_o$, $D_r$ at the current frame (k-1), the scheduling unit 202 applies an algorithm (described above) which makes scheduling decisions that will determine $D_o$, $D_r$, $T_o$ and $T_b$ (described below) of the next frame k. These decisions are then passed to the mobile users 216 via the control channel 214. Each mobile user 216 then transmits voice packets and data packets over the traffic channel 212 according to this assignment schedule while the control unit 204 provides the appropriate connectivity in the REN 104.

Figure 7B:
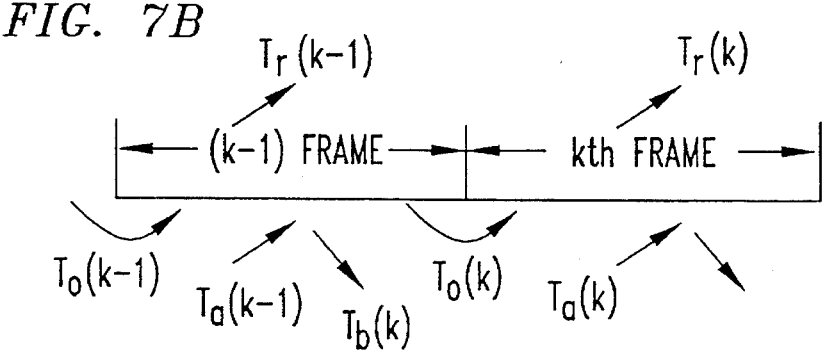

FIGS. 7B and 7C are traffic flow diagrams for voice and data, respectively. In steady-state operation, the flow equation for voice calls may be written as:

$$T(k)=T_o(k-1)-T_r(k-1)+T_a(k-1)=T_o(k)+T_b(k) \quad (1)$$

In this equation, matrices $T_o$, $T_r$, $T_a$ and $T_b$ represent the active calls, terminated calls, new call requests and blocked calls, respectively, while T is the matrix of total calls in a frame. Matrix $T_o$ must satisfy the scheduling conditions:

$$\sum_{i=1}^{N} t_{ij}(T_o) \leq L_c \quad (2\text{-a})$$

$$\sum_{j=1}^{N} t_{ij}(T_o) \leq L_c \quad (2\text{-b})$$

where $t_{ij}(T_o)$ is any entry at row i and column j of matrix $T_o$. Conditions (2-a, 2-b) indicate that the number of time slots used for voice calls from a particular input port (i.e., end user) or to a particular destination output port (i.e., end user) should not exceed $L_c$. If the above conditions are not satisfied by any new call requests, then these calls will be blocked and extracted from matrix $T_a$.

The flow equation for data packets may be written as:

$$D(k)=D_r(k-1)+D_a(k-1) \quad (3\text{-a})$$

$$D(k)=D_o(k)+D_r(k) \quad (3\text{-b})$$

where matrices $D_a$, $D_o$, $D_r$ and D represent the newly arrived packets, packets scheduled for transmission, packets in buffers (not scheduled for transmission), and total packet traffic, respectively. Matrix $D_o$ with entries $d_{ij}$ must satisfy the following conditions:

$$\sum_{i=1}^{N} \{t_{ij}(T_o) + d_{ij}(D_o)\} \leq L \quad (4-a)$$

$$\sum_{j=1}^{N} \{t_{ij}(T_o) + d_{ij}(D_o)\} \leq L \quad (4-b)$$

That is, the number of time slots of both voice calls and data packets scheduled for transmission from a particular input or to a particular destination output cannot exceed L. It is assumed that unused voice time slots may be used for packets.

Given matrix D of total packets, if conditions (4-a, 4-b) do not hold true, packet traffic is extracted from matrix D in order to do so. A procedure to extract entries from matrix D so that conditions (4-a, 4-b) are satisfied is described above. The number of packets extracted, represented by matrix $D_r$, remain in buffers 610 in the mobile terminals 602 until scheduled for transmission in subsequent frames.

A scheduling algorithm (described above) is then used on matrices $T_o$ and $D_o$ in order to have the voice and data packets represented therein transmitted within a frame of L time slots long. Pursuant to this scheduling algorithm, matrix $T_o + D_o$ is represented as a sum of switching matrices $T_1$ and $D_1$:

$$T_o + D_o = \sum_{l=1}^{N} (T_l + D_l) \quad (5)$$

Each switching matrix has at most a unit entry in each row or column and thus permits routing of traffic from input to output without conflict. Time slots of active circuit calls may have to be reassigned if the algorithm seeks optimality.

An example of a voice traffic matrix 802 scheduled over a frame is shown in FIG. 8A, where N=3, $L_c$=3, and L=5. The rows of the matrix 802 corresponds to output ports (i.e., destination end users) and the columns of the matrix 802 corresponds to input ports (i.e., source end users). Each element of the matrix 802 signifies the number of voice packets to be received from a particular input port and to transferred to a particular output port. Thus, matrix 802 indicates that two voice packets are to be received from input port b and are to transferred to output port a'.

FIG. 8B depicts the manner in the voice packets represented in the matrix 802 have been scheduled for transmission over the traffic channel 212 during the frame. For example, in time slot 1 of the frame, a voice packet is scheduled to be received from input port b and transferred to output port b'. Such scheduling in more particularly depicted in FIGS. 8C and 8D. FIG. 8C depicts in greater detail the scheduling for receiving voice packets from input ports, and FIG. 8D depicts in greater detail the scheduling for transmitting voice packets to output ports.

Figures 8E, 8F:
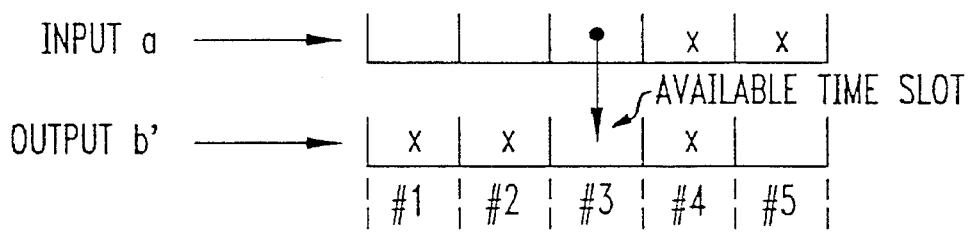

FIG. 8E illustrates the constraints imposed on the system 102 by the moveable boundary approach. Suppose that a new call request from input a to output b' is received. Note that there is an available time slot (time slot 3). Despite the existence of this available time slot, the call will be blocked since the row sum of row 2 is 3, which is equal to $L_c$ (see equations 2-a and 2b).

An example switch matrix corresponding to the traffic matrix 802 in FIG. 8A and the scheduling depicted in FIGS. 8B-8D, is presented in FIG. 8F.

In the following sections, the performance of the system 102 is analyzed. This analysis assumes that arrivals are governed by independent and identical Bernouli processes for each of the N inputs and for both voice calls and data packets. Furthermore, this analysis is based on the assumption that the number of calls passing from a given input to a given output is negligible relative to the total number of calls handled by either. Under these conditions, as N increases, the input and output Markov chains approach dynamic independence due to the fact that the setting time of the Markov chain becomes negligible compared to the time between connection requests between a given input-output pair.

4.1 Distributions of Voice Calls

Assuming no voice activity detection, the probability distribution of voice call arrivals to the input ports during a frame of length L is:

$$Pr[r_i(T_a) = l] = \binom{L}{l} \sigma_c^l (1 - \sigma_c)^{L-l} \quad (6)$$

$$0 \leq l \leq L$$

where $\sigma_c$ is the probability of a voice call arrival in one time slot. Let $r_i^{(k)}(T_o), r_i^{(k)}(T_b), r_i^{(k)}(T)$ be the random variables for the row sum of matrices $T_o$, $T_b$, and T, respectively, at the kth frame. Following flow equation (1), we have:

$$r_i^{(k)}(T) = r_i^{(k)}(T_o) + r_i^{(k)}(T_b) \quad (7\text{-}a)$$

$$r_i^{(k)}(T) = r_i^{(k-1)}(T_o') + r_i^{(k-1)}(T_a) \quad (7\text{-}b)$$

where $r_i^{(k-1)}(T_o') = r_i^{(k-1)}(T_o - T_r)$, in which $T_r$ is the matrix of terminated calls. The probability distribution of $r_i(T_o')$ can be computed using the assumption: Prob[l calls remain active(not terminated) / a the total active calls]=$\binom{a}{l}\rho_c^l(1-\rho_c)^{a-l}$ where $(1-\rho_c)$ is the probability that a particular call terminates in the current frame. Hence $$Pr[r_i^{(k)}(T_o') = l/r_i^{(k)}(T_o) = a] = \binom{a}{l} \rho_c^l (1 - \rho_c)^{a-l} \quad (8)$$

$$0 \leq a \leq L_c$$

The random variables in the right hand side of equation (7-b) are independent, hence the distribution of $r_i^{(k)}(T)$ is the convolution summation:

$$Pr[r_i^{(k)}(T) = l/r_i^{(k-1)}(T_o) = a] = \sum_{m=0}^{a} p_{k-1}(m/a) q_{k-1}(l - m) \quad (9)$$

$$0 \leq a \leq L_c$$

Where $p_{k-1}(m/a) = Pr[r_i^{(k-1)}(T_o') = m/r_i^{(k-1)}(T_o) = a]$ is given by equation (8), and $p_{k-1}(M/a) = Pr[r_i^{k-1}(T_o') = m/r_i^{(k-1)}(T_o) = a]$ is given by equation (6). The random variables $r_i^{(k)}(T_o)$ and $r_i^{(k)}(T_b)$ in equation (7-a) depend on each other as follows:

$$r_i^{(k)}(T_o) = \min \{r_i^{(k)}(T), L_c\} \quad (10\text{-}a)$$

$$r_i^{(k)}(T_b) = \max \{0, (r_i^{(k)}(T) - L_c)\} \quad (10\text{-}b)$$

Figure 9A:
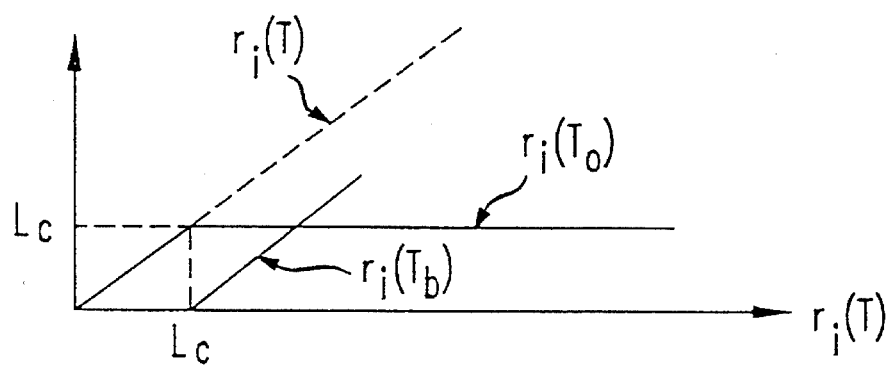
FIGS. 9A–9C, 10A, and 10B are used to describe a system model of the present invention.

Relations (10-a) and (10-b) are illustrated in FIG. 9A. Equations (10-a, 10-b) are based on the assumption that no more than $L_c$ slots per frame can be used for voice circuit calls. Any arrival more than $L_c$ is blocked. In addition, it is assumed that the algorithm always schedules exactly $L_c$ calls if $r_i(T) \geq L_c$, (optimum algorithm). Hence, in order to avoid excessive blocking of new call arrivals, we must have at $\sigma_c \ll L_c$. Given relation (10-a), the distribution of $r_i^{(k)}(T_o)$ is:

$$Pr[r_i^{(k)}(T_o) = l] = \begin{cases} Pr[r_i^{(k)}(T) = l] & \text{for } 0 \leq l \leq L_c - 1 \\ \sum_{l_o=L_c}^{L+L_c} Pr[r_i^k(T) = l_o] & \text{for } l = L_c \\ 0 & \text{for } l > L_c \end{cases} \quad (11)$$

The distribution of $r_i^{(k)}(T_b)$ follows from equation (10-b):

$$Pr[r_i^{(k)}(T_b) = l] = \begin{bmatrix} \sum_{l_o=0}^{L_c} Pr[r_i^k(T) = l_o] & \text{for } l = 0 \\ Pr[r_i^{(k)}(T) = L_c + l] & \text{for } l = 0 \end{bmatrix} \quad (12)$$

Let $t_o(T_a)$ be the total number of call arrivals $$t_o(T_a) = \sum_{i=1}^{N} r_i(T_a)$$

where $r_i(T_a)$ are independent random variables, the distribution is given by:

$$Pr[t_o(T_a) = l] = \binom{NL}{l} \sigma_c^l (1 - \sigma_c)^{NL-l} \quad (13)$$

$$0 \leq l \leq NL$$

The call arrival process to a particular output is given by the distribution of the column sum below:

$$Pr[c_j(T_a) = l/t_o(T_a) = m] = \binom{m}{l}(1/N)^l(1 - 1/N)^{m-l} \quad (14\text{-a})$$

$$0 \leq m \leq NL$$

$$Pr[c_j(T_a) = l] = \sum_{m=0}^{NL} Pr[c_j(T_a) = l/t_o(T_a) = m] Pr[t_o(T_a) = m] \quad (14\text{-b})$$

In equation (14-a) it has been assumed that each call has equal probability of being addressed to any of the N outputs. The flow equations at each output port are similar to the ones for the input port, shown in equations (7-a, 7-b), hence:

$$c_j^{(k)}(T) = c_j^{(k)}(T_o) + c_j^{(k)}(T_b) \quad (15\text{-a})$$

$$c_j^{(k)}(T) = c_j^{(k-1)}(T_o') + c_j^{(k-1)}(T_a) \quad (15\text{-b})$$

Output calls are represented by the column sum of the corresponding matrices. The termination process $c_j^{(k-1)}(T_o') = c_j^{(k-1)}(T_o - T_r)$ is the same as for the inputs. The relations between the above random variables are given by:

$$c_j^{(k)}(T_o) = \min \{c_j^{(k)}(T), L_c\} \quad (16\text{-a})$$

$$c_j^{(k)}(T_b) = \max \{0, (c_j^{(k)}(T) - L_c)\} \quad (16\text{-b})$$

The probability distribution of active calls $Pr[c_j^{(k)}(T_o) = l]$ and blocked calls $Pr[c_j^{(k)}(T_b) = l]$ for a given output j, $1 \leq j \leq N$, can be expressed as a function of the probability distribution $Pr[c_j^{(k)}(T)]$, in a similar way to that for the input process shown in equations (11) and (12).

4.2 Packet Delay Analysis

The packet arrival process is given by:

$$Pr[r_i(D_a) = l] = \binom{L}{l} \sigma_p^l (1 - \sigma_p)^{L-l} \quad (17)$$

$$0 \leq l \leq L$$

where $\sigma_p$ is the probability of a packet arrival in a time slot. Each packet is assumed to be one time-slot long. Let $l_{c_1}$ be the number of input slots occupied by calls, i.e., $l_{c_1} \equiv r_i^{(i)}(T_o)$; its distribution is given in equation (11). The available slots for packets then are $l_{p_1} = L - l_{c_1}$, where $l_{p_1} \geq L_p$. The region $L_p < l \leq l_p$ is called the overload region. Utilization of the overload region may result in long packet delays. Therefore, for stability reasons, we assume that the average packet arrivals $L\sigma_p \ll L_p$.

The distribution of the total number of packets arrived $$t_a(D_a) = \sum_{i=1}^{N} r_i(D_a)$$

is given by:

$$Pr[t_a(D_a) = l] = \binom{NL}{l} \sigma_p^l (1 - \sigma_p)^{NL-l} \quad (18)$$

$$0 \leq l \leq NL$$

Since $r_i(D_a)$ are independent random variables, the packet arrival process per destination output j is given by:

$$Pr[c_j(D_a) = l/t_o(D_a) = m] = \binom{m}{l}(1/N)^l(1 - 1/N)^{m-l} \quad (19\text{-a})$$

$$0 \leq m \leq NL$$

$$Pr[c_j(D_a) = l] = \sum_{m=0}^{NL} Pr[c_j(D_a) = l/t_o(D_a) = m] Pr[t_o(D_a) = m] \quad (19\text{-b})$$

Following flow equations (3-a, 3-b), the relations between column sums of matrices D, $D_o$, $D_a$, and $D_r$ are:

$$c_j^{(k)}(D) = c_j^{(k-1)}(D_r) + c_j^{(k-1)}(D_a) \quad (20\text{-a})$$

$$c_j^{(k)}(D) = c_j^{(k)}(D_o') + c_j^{(k)}(D_r) \quad (20\text{-b})$$

The dependence relations of the above random variables are:

$$c_j^{(k)}(D_o) = \min \{c_j^{(k)}(D), l_{p_j}^{(k)}\} \quad (21\text{-a})$$

$$c_j^{(k)}(D_r) = \max \{0, (c_j^{(k)}(D) - l_{p_j}^{(k)})\} \quad (21\text{-b})$$

Figure 9B:
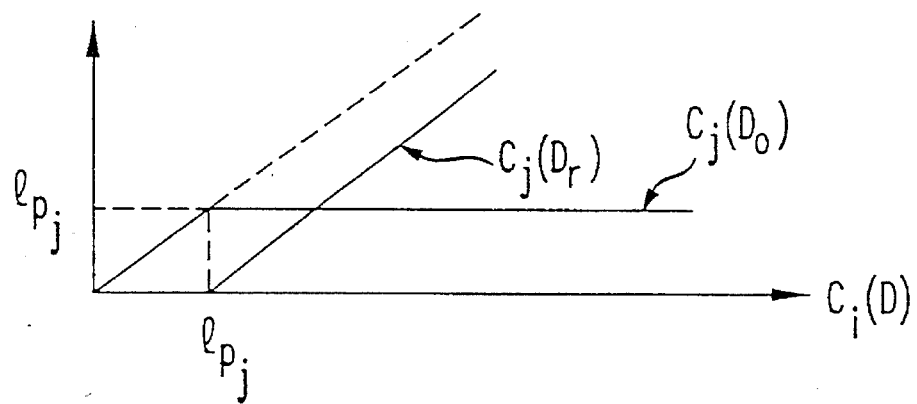
Figure 9C:
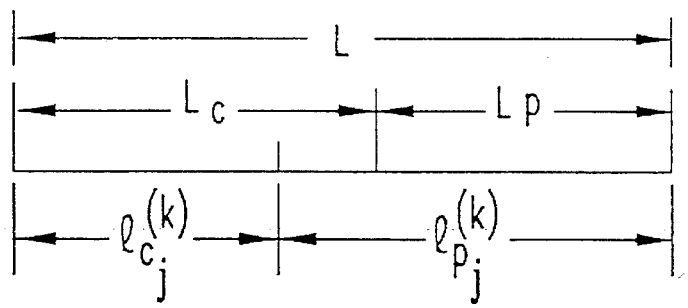

The above relations are illustrated in FIG. 9B. These relations are written under the assumption that unused voice time slots are assigned for packets. It is also assumed that the scheduling algorithm has the capability of assigning all available slots ($l_{pj}$) to packets if $c_j(D) \geq l_{pj}$, where $$l_{p_j}^{(k)} = L - l_{c_j}^{(k)} \text{ and } l_{c_j}^{(k)} \equiv C_j^{(k)}(T_o) \quad (21\text{-c})$$

The conditional distributions of $c_j^{(k)}(D_o)$ and $c_j^{(k)}(D_r)$ that follow from equations (21-a, 21-b) are:

$$Pr[c_j(k)(D_o) = l/c_j(k) = h] = \begin{cases} Pr[c_j(k)(D) = l/l_{c_j}^{(k)} = h] & \text{for } 0 \leq l \leq l_{p_j}^{(k)} = L - h \\ \sum_{l_o=L-h}^{L_{max}} Pr[C_j^{(k)}(D) = l_o/l_{c_j}^{(k)} = h] & \text{for } l = l_{p_j}^{(k)} = L - h \\ 0 \text{ for } l > l_{p_j}^{(k)} = L - h \end{cases} \quad (22)$$

where $l_{max}$ is the maximum number of packets that may have been in the buffers from previous frames and the maximum number of packets that may arrive in the current frame.

$$Pr[c_j^{(k)}(D_r) = l/t_{c_j}^{(k)} = h] = \begin{cases} \sum_{t_o=0}^{L-h} Pr[c_j^{(k)}(D) = l_o/t_{c_j}^k = h] & \text{for } l = 0 \\ Pr[c_j^{(k)}(D) = L - h + l/t_{c_j}^{(k)}] & \text{for } l \geq 1 \end{cases} \quad (23)$$

In equation (20-a), random variables $c_j(D_a)$ and $c_j(D_r)$ are independent and thus the distribution of the sum is given by the convolution summation:

$$Pr[c_j^{(k)}(D) = l] = \qquad (24\text{-a})$$

$$\sum_{h=0}^{L_c} Pr[c_j^{(k)}(D) = l/t_{C_j}^{(k-1)} = h] Pr[c_j^{(k-1)}(T_0) = t_{C_j}^{(k-1)} = h]$$

where, $$Pr[c_j^{(k)}(D) = l/t_{C_j}^{(k-1)} = \sum_{m=0}^{NL} r_{k-1}(l - m/h) g_{k-1}(m) \qquad (24\text{-b})$$

where, $r_{k-1}(l-m)/h) = Pr[c_j^{(k-1)}(D_r) = l - m/l_{C_j}^{(k-1)} = h]$ and $g_{k-1}(m) = Pr[c_j^{k-1}(D_a) = m]$

4.3 Computation of Steady-State Distributions

Figure 10A:
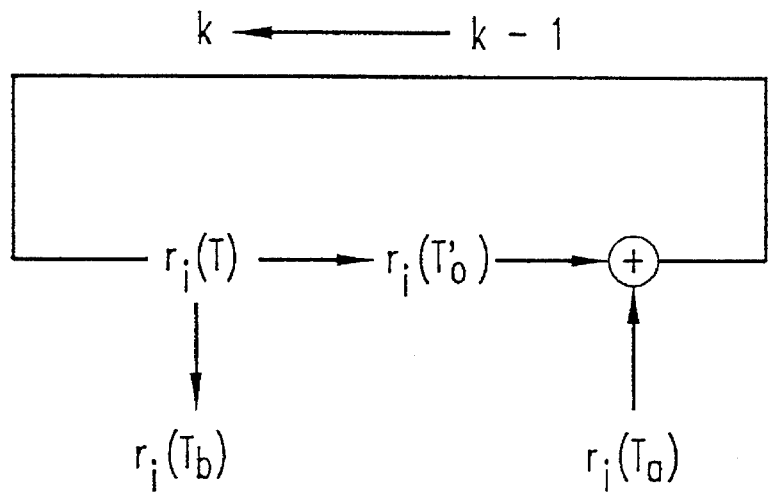
Figure 10B:
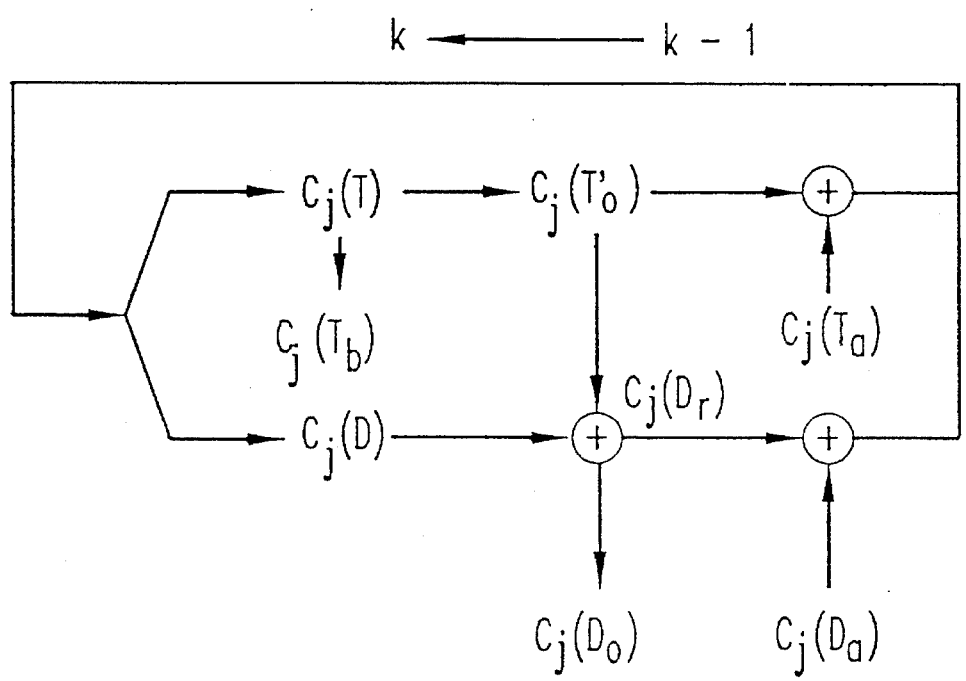

The steady state of the random variables, $r_i(T_o)$, $r_i(T_b)$, $c_j(T_o)$, $c_j(T_b)$, $c_j(D_o)$ and $c_j(D_r)$ is obtained iteratively as shown in FIGS. 10A and 10B, starting at k=0, where $r_i^{(0)}(T) = r_i(T_a)$, $c_j^{(0)}(T) = c_j(T_a)$ and $c_j^{(0)}(D) = c_j(D_a)$. Hence, $Pr[r_i^{(0)}(T)] = Pr[r_i(T_a)]$, $Pr[c_j^{(0)}(T)] = Pr[c_j(T_a)]$ and $Pr[c_j^{(0)}(D)] = Pr[c_j^{(0)}(D_a)]$.

In each iteration $Pr[r_i^{(k-1)}(T)]$, $Pr[c_j^{(k-1)}(T)]$ and $Pr[c_j^{(k-1)}(D)]$, are used to compute the probability distribution of the random variables $r_i^{(k-1)}(T_o')$, $r_i^{(k-1)}(T_b)$, $c_j^{(k-1)}(T_o)$, $c_j^{(k-1)}(T_b)$, $c_j^{(k-1)}(D_o)$ and $c_j^{(k-1)}(D_r)$, which in turn are used to compute the distributions of $r_i^{(k)}(T)$, $c_j^{(k)}(T)$, and $c_j^{(k)}(D)$. Specifically, $Pr[r_i^{k-1}(T)]$ is used to compute $Pr[r_i^{(k-1)}(T_o)]$ and $Pr[r_i^{(k-1)}(T_b)]$ via equations (11) and (12). Similarly, $Pr[c_j^{(k-1)}(T)]$ is used to compute $Pr[c_j^{(k-1)}(T_o)]$ and $Pr[c_j^{(k-1)}(T_b)]$. Next $Pr[c_j^{(k-1)}(D)]$, $Pr[c_j^{(k-1)}T_o)]$ and equations (22) and (23) are used to compute $Pr[c_j^{(k-1)}(D_r)]$ and $Pr[c_j^{(k-1)}(D_o)]$.

The next step is to use $Pr[r_i^{(k-1)}(T_o)]$ to compute $Pr[r_i^{(k)}(T)]$ via equations (9), (8) and (6). Similarly, $Pr[c_j^{(k-1)}(T_o)]$, is used to compute $Pr[c_j^{(k)}(T)]$ and finally $Pr[c_j^{(k-1)}(D_r)]$, $Pr[c_j^{(k-1)}(D_o)]$ and $Pr[c_j^{(k-1)}(T_o)]$ are used to compute $Pr[c_j^{(k)}(D)]$.

The procedure continues until convergence is achieved.

4.4 Call Blocking Probability

The call blocking probability $P_B$ is defined as the probability that the call will be blocked at either the input and/or output port i.e., $P_B = \text{Prob}[(\text{call blocked at the input}) \cup (\text{call blocked at the output})]$. The blocking probability can be expressed as a function of the distributions of the random variables $r_i(T_o)$ and $c_j(T_o)$ as follows:

$$P_b = Pr[r_i(T_o) = L_c] + Pr[c_j(T_o) = L_c] - Pr[r_i(T_o) = L_c] Pr[c_j(T_o)] = L_c] \quad (25)$$

In order to avoid excessive blocking, we must have call arrival rate $L\sigma_c \ll L_C$.

4.5 Average Packet Delay

Incoming packets arriving to the input buffer are not always served in FIFO order, for the reason that the scheduling algorithm in maximizing throughput discards the FIFO discipline. Hence, in order to estimate the average packet delay we first estimate the expected number of frames until packet transmission. For this purpose let $P_{n/lpj}$ denote the probability that a packet is transmitted in the nth frame from its arrival conditioned on the fact that $l_{pj} = L - l_{cj} (0 \leq l_{cj} \leq L_c)$, time slots per frame are available for packets. The expected number of frames until a packet transmission is given by the following expression:

$$E(n) = \begin{cases} \sum_{n=1}^{\infty} n \left[ \sum_{l_{cj}=0}^{L_c} P_{n/l_{pj}} Pr[c_j(T_o) = l_{cj}] \right] & \text{for } L_c < L \\ \sum_{n=1}^{\infty} n \left[ \sum_{l_{cj}=0}^{L_c-1} P_{n/l_{pj}} Pr[c_j(T_o) = l_{cj}] \right] / [1 - Pr(c_j(T_o) = L_c)] & \text{for } L_c = L \end{cases} \quad (26\text{-a})$$

To compute the conditional probability $P n/l_{pj}$ we note that in each frame we can schedule up to $l_{pj}$ packets. Based on this observation we have that $$P_{1/l_{pj}} = \sum_{l=0}^{l_{pj}} Pr[c_j(D) = l/l_{p_j}] \quad \text{for } 0 \leq l \leq l_{pj}$$

$$P_{2/l_{pj}} = \sum_{l=l_{pj}+1}^{2l_{pj}} Pr[c_j(D) = l/l_{p_j}] \quad \text{for } l_{pj} + 1 \leq l \leq 2l_{pj} \ldots$$

$$Pn/l_{pj} = \sum_{t=(n-1)l_{pj}+1}^{nl_{pj}} Pr[c_j(D) = l/l_{p_j}]$$

for $(n-1)l_{pj} + 1 \leq l \leq nl_{pj}$

Assuming that on the average a packet arrives and departs in the middle of the frame, the average packet delay in time slots is $$\overline{D} = LE(n) \qquad (26\text{- b})$$

5. Performance Results

In this section, the performance of the system 102 as a function of the offered voice call load is considered. The metrics used to characterize system performance are the call blocking probability and the average packet delay. The effect of various design parameters on system performance is also studied. Specifically, we consider the effect of the frame length size L, the number $L_c$ of time slots assigned to voice calls, and the packet offered load.

In the performance study, we assume time slot length of 1 msec. The average voice call duration is equal to 2 minutes. The performance results are obtained under the assumption that the traffic between any given input-output pair is small compared to the total traffic handled by each of the input, output ports individually, which is reasonable for large values of N. This implies that the location of the occupied time slots at the input and output ports is approximately independent, an assumption that provides an upper bound on the voice call blocking probability.

Figure 11A:
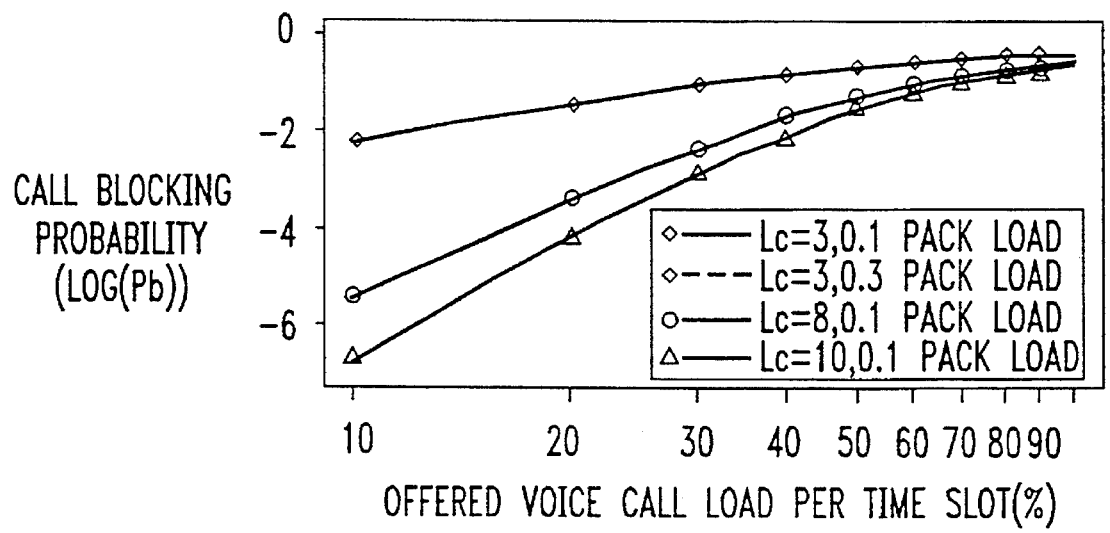
FIGS. 11A, 11B, 12A, and 12B are used to illustrate the performance of the present invention.
Figure 11B:
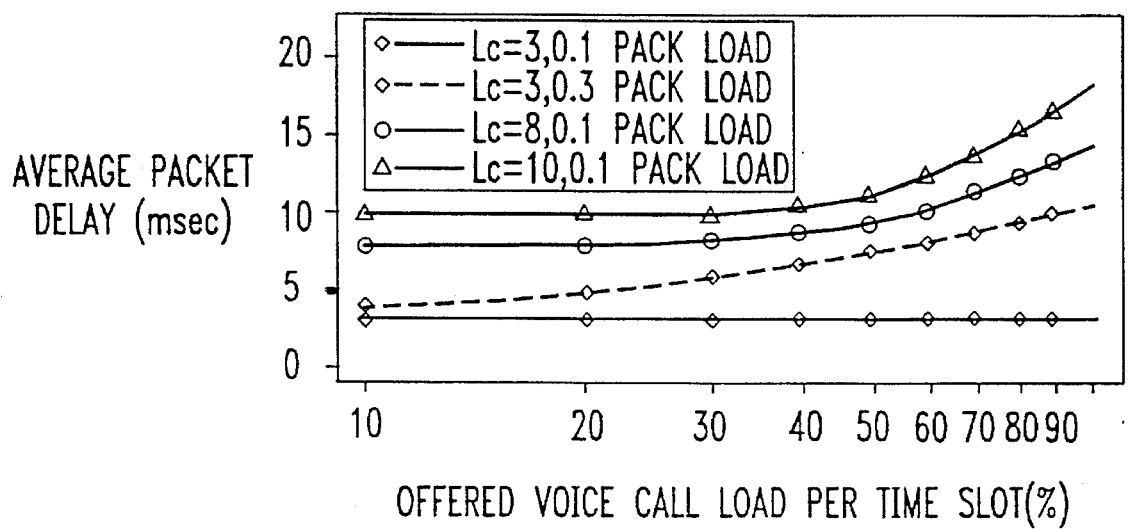

In FIGS. 11A and 11B, system performance is shown as a function of offered voice call load per time slot for various frame size lengths, namely L=3,8, and 10. The packet arrival rate is equal to 100 packets/sec, which implies a 10% packet load. The number of slots $L_c$ assigned to voice calls is equal to L, i.e, the entire frame is assigned to voice calls but any unused time slots can be assigned momentarily to packets. In FIG. 11A, the call blocking probability is plotted as a function of the call offered load per time slot for various frame lengths. From this FIG. 11A, note that as the frame size increases the call blocking probability decreases. The tradeoff is an associated increase in the average packet delay.

This can be seen from FIG. 11B, where the average packet delay is plotted as a function of the voice call offered load per time slot. From this FIG. 11B, note that the average packet delay is around L time slots for a wide range of voice call arrival rates and it increases significantly only under heavy call load. The standard deviation of the packet delay (not shown in FIG. 11B) is small for call offered load per time slot less than 50%, but it increases as the call offered load per time slot increases beyond 60%.

In order to study the performance of the system as a function of the packet load, in FIGS. 11A and 11B we show performance results for L= $L_c$=3 and 10% (100p/s), 30% (300p/s) packet loads. From FIG. 11A, note that changes in the packet load do not effect the voice call blocking probability as expected since the system is designed to guarantee a voice call performance level regardless of the packet load. From FIG. 11B, note that for low packet loads we can choose $L_c$, equal to L without significantly impacting the performance of the packet traffic. This behavior changes as the packet load increases. In this case, performance can be improved by decreasing the number of time slots $L_c$, assigned to voice calls, at the expense of an associated increase in the call blocking probability.

Figure 12A:
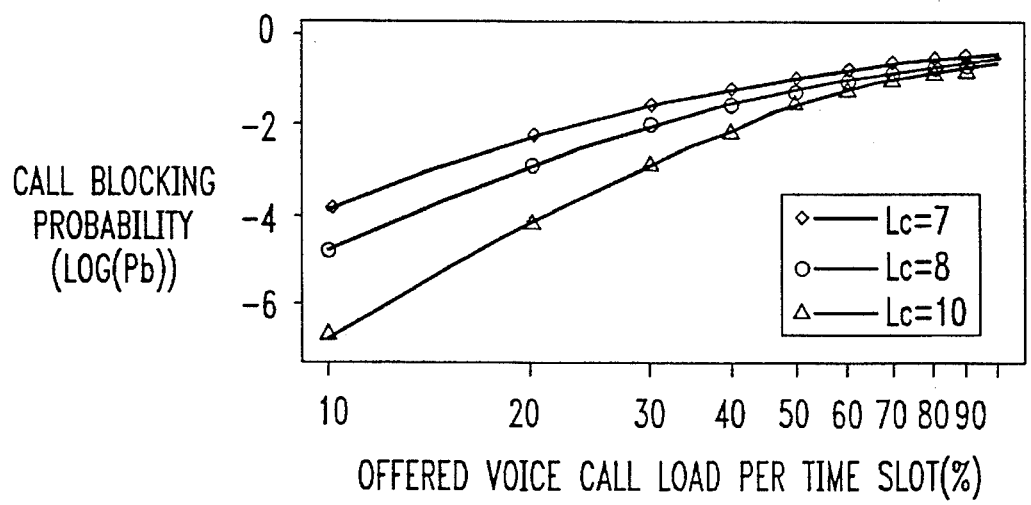
Figure 12B:
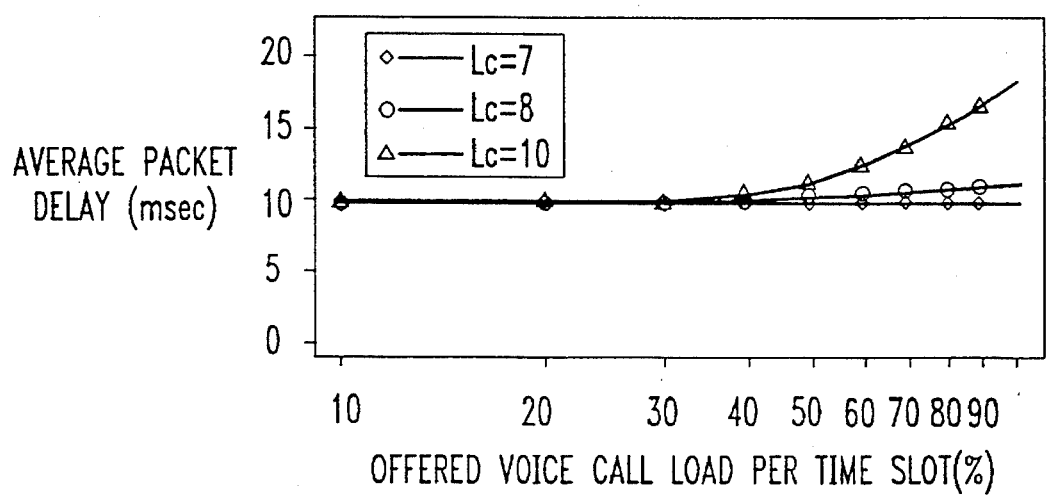

The impact on system performance of the number $L_c$ of time slots assigned to voice call traffic is studied in FIGS. 12A and 12B. Results are shown for L=10, 10% packet load, and three values of $L_c$, namely $L_c$=7, 8, and 10. Note that by decreasing the value of $L_c$, we increase the call blocking probability and significantly decrease the average packet delay. This is due to the fact that by decreasing the value of $L_c$ we decrease the time slots available for voice call traffic, and increase the time slots available for packet traffic.

Let us now consider a particular design example in which frames are 10 msec long and L=$L_c$=10 time slots. Also let voice be encoded at the rate of 16 kb/s which corresponds to 160 bits/frame. Given the maximum acceptable blocking probability of $10^{-2}$, the corresponding call arrival rate will be about 12 calls/hour/timeslot (see FIG. 12A). This represents a 40% offered voice call load per time slot, given that the average call duration is 2 min. The corresponding packet delay will be about 11 msec, at packet arrival rate of 100 packets/sec.

6. Conclusion

In summary, the present invention employs a demand assignment approach so as to achieve a high capacity wireless system for interconnecting mobile users in a community of interest. The system achieves high performance by allocating (upon request) a direct path between the mobile end users, which implies that no buffering, processing of packet headers, voice encoding/decoding or transmission delays takes place at the exchange node. In addition, the system provides efficient channel utilization and integration of voice and data traffic which is extended to both the access channel and switching equipment.

The "movable boundary" approach is employed in order to provide dynamic sharing of TDMA slots between voice and data traffic. A control mechanism and a scheduling algorithm at the REN allocate system resources in order to maximize throughput and optimize capacity distribution. The system's air-interface is based on TDMA which consists of the traffic and control channels (or time slots). The access mechanism for the uplink control channel may be either TDMA or Random (Aloha), which enables mobile controlled handoff.

In order to study the performance of the system, a system model was developed in which frames have fixed lengths and channel and time slot assignments are made by an optimum scheduling algorithm. Unscheduled voice calls are blocked, while unscheduled data packets are buffered to be scheduled in subsequent frames. The analysis uses a discrete time Markov model to derive steady-state probability distributions of active calls, blocked calls and queue sizes of data packets.

The performance results provide call blocking probabilities and data packet delays. These results represent an upper bound on the performance of the system since they are based on optimum scheduling. The complexity of an optimum algorithm will be bounded by $O(LN^3)$. However, its computational time can be reduced by using a parallel programming approach. Suboptimum scheduling algorithms that offer reduced computational complexity and nearly optimum performance characteristics can also be used. The system may also operate with random scheduling which is computationally simple.

The proposed system can also implement voice activity detection or digital speech interpolation (DSI) in order to further increase the system capacity in number of voice calls. This is achieved by sending a message request over the control channel each time voice activity is detected. The expected capacity increase will be proportional to the voice activity factor.

While various embodiments of the present invention have been described above, it should be understood that they have been presented by way of example only, and not limitation. Thus, the breadth and scope of the present invention should not be limited by any of the above-described exemplary embodiments, but should be defined only in accordance with the following claims and their equivalents.

What is claimed is:

1. A method of assigning time slots to mobile users in a wireless communication system supporting wireless communication applications where both end users of a communication link are mobile, comprising the steps of:

(1) receiving time slot reservation requests from the mobile users during a first frame, each of said time slot reservation requests comprising information identifying a source end user and a destination end user;

(2) generating during said first frame a voice traffic matrix and a data traffic matrix by using said time slot reservation requests, said voice traffic matrix comprising source end user information and destination end user information for all active voice calls, and said data traffic matrix comprising source end user and destination end user information for all pending data packets;

wherein step (2) comprises the steps of, (a) identifying which of said time slot reservation requests, if any, represent new voice call requests, and (b) determining whether to accept said identified new voice call requests, said identified new voice call requests which are accepted representing a subset of said active voice calls, and said identified new voice call requests which are not accepted representing blocked voice calls;

(3) generating, during said first frame, time slot assignment information based on said voice traffic matrix and said data traffic matrix; and (4) transmitting, during said first frame, said time slot assignment information to the mobile users;

wherein the mobile users transmit and receive voice packets and data packets during time slots of a second frame as specified by said time slot assignment information.

2. The method of claim 1, in which $L_c$ time slots in each frame are reserved for voice service, wherein step (2)(b) comprises the step of accepting one of said identified new voice call requests when conditions A and B are satisfied:

$$\sum_{i=1}^{N} t_{ij}(T_o) \leq L_c \quad \text{(Condition A)}$$

$$\sum_{j=1}^{N} t_{ij}(T_o) \leq L_c \quad \text{(Condition B)}$$

where $T_o$ represents a matrix of said active voice calls, and $t_{ij}(T_o)$ represents an entry at row i and column j of matrix $T_o$.

3. The method of claim 1, wherein step (3) comprises the step of:

assigning a time slot in each frame to each active voice call represented in said voice traffic matrix, such that voice service is guaranteed.

4. The method of claim 1, wherein step (3) comprises:

(a) determining whether sufficient capacity exists to transmit all of said pending data packets represented in said data traffic matrix during said second frame; and (b) if it is determined in step (3)(a) that sufficient capacity does not exist, then extracting dam packet information from said data traffic matrix until said data traffic matrix only contains data traffic information for data packets that can be transmitted during said second frame.

5. The method of claim 4, in which each frame includes L time slots, wherein step (3)(a) comprises the step of:

determining that sufficient capacity does not exist if L is less than a sum of said active voice calls and said pending data packets.

6. The method of claim 1, in which each frame includes L time slots, wherein step (3) comprises the steps of:

(a) scheduling for transmission in $L_c$ of said L time slots said active voice calls represented in said voice traffic matrix;

(b) identifying any of said $L_c$ time slots not being used for voice service; and (c) scheduling for transmission in $L_p$ of said L time slots and said identified $L_c$ time slots said pending data packets represented in said data traffic matrix, wherein the sum of said $L_c$ and $L_p$ time slots equals said L time slots.

7. The method of claim 6, wherein step (4) comprises the steps of:

(a) identifying any of said pending data packets not scheduled for transmission in said $L_p$ time slots and said identified $L_c$ time slots; and (b) causing the mobile users to buffer said identified data packets.

8. A method of assigning time slots to mobile users in a wireless communication System supporting wireless communication applications where both end users of a communication link are mobile, comprising the steps of:

(1) receiving time slot reservation requests from the mobile users during a first frame, each of said time slot reservation requests comprising information identifying a source end user and a destination end user;

(2) generating during said first frame a voice traffic matrix and a data traffic matrix by using said time slot reservation requests, said voice traffic matrix comprising source end user information and destination end user information for all active voice calls, and said data traffic matrix comprising source end user and destination end user information for all pending data packets;

(3) generating, during said first frame, time slot assignment information based on said voice traffic matrix and said data traffic matrix, wherein step (3) comprises the step of employing a predetermined scheduling algorithm to generate said time slot assignment information, said predetermined scheduling algorithm supporting fixed length frames, integrated voice and data service, guaranteed voice service, buffering of data packets by the mobile users, and a moveable boundary approach wherein $L_c$ time slots in each frame are reserved for voice service, $L_p$ time slots in each frame are reserved for data service, and any of said $L_c$ time slots not used for voice service may be used for data service; and (4) transmitting, during said first frame, said time slot assignment information to the mobile users;

wherein the mobile users transmit and receive voice packets and data packets during time slots of a second frame as specified by said time slot assignment information.

9. A wireless communication system, comprising:

a radio exchange node, REN;

a plurality of RF-distribution points, RDPs, each including antenna equipment to receive time slot reservation requests from mobile users, and to forward said time slot reservation requests to said REN; said REN comprising:

a switch;

a scheduling unit to receive said time slot reservation requests from said RDPs during a first frame, to generate during said first frame a voice traffic matrix and a data traffic matrix by using said time slot reservation requests and a fixed frame, moveable boundary approach wherein $L_c$ time slots in each frame are reserved for voice service, $L_p$ time slots in each frame are reserved for data service, and any of said $L_c$ time slots not used for voice service may be used for data service, and said voice traffic matrix comprising source and destination end user information for all active voice calls, and said data traffic matrix comprising source and destination end user information for all pending data packets, and to generate during said first frame time slot assignment information based on said voice traffic matrix and said data traffic matrix; and a control unit to transmit, during said first frame, said time slot assignment information to said mobile users via said RDPs, and to control said switch such that connectivity is provided between said mobile users during a second frame in accordance with said time slot assignment information.

10. A system of assigning time slots to mobile users in a wireless communication system supporting wireless communication applications where both end users of a communication link are mobile, comprising:

receiving means for receiving time slot reservation requests from the mobile users during a first frame, each of said time slot reservation requests comprising information identifying a source end user and a destination end user;

matrix generating means for generating during said first frame a voice traffic matrix and a data traffic matrix by using said time slot reservation requests, said voice traffic matrix comprising source end user information and destination end user information for all active voice calls, and said data traffic matrix comprising source end user and destination end user information for all pending data packets;

wherein said matrix generating means comprises, means for identifying which of said time slot reservation requests, if any, represent new voice call requests, and new call accepting means for determining whether to accept said identified new voice call requests, said identified new voice call requests which are accepted representing a subset of said active voice calls, and said identified new voice call requests which are not accepted representing blocked voice calls; time slot assignment information generating means for generating, during said first frame, time slot assignment information based on said voice traffic matrix and said data traffic matrix; and transmitting means for transmitting, during said first frame, said time slot assignment information to the mobile users;

wherein the mobile users transmit and receive voice packets and data packets during time slots of a second frame as specified by said time slot assignment information.

11. The system of claim 10, in which $L_c$ time slots in each frame are reserved for voice service, wherein said new call accepting means comprises means for accepting one of said identified new voice call requests when conditions A and B are satisfied:

$$\sum_{i=1}^{N} t_{ij}(T_o) \leq L_c \quad \text{(Condition A)}$$

$$\sum_{j=1}^{N} t_{ij}(T_o) \leq L_c \quad \text{(Condition B)}$$

where $T_o$ represents a matrix of said active voice calls, and $t_{ij}(T_o)$ represents an entry at row i and column j of matrix $T_o$.

12. The system of claim 10, wherein said time slot assignment information generating means comprises:

means for assigning a time slot in each frame to each active voice call represented in said voice traffic matrix, such that voice service is guaranteed.

13. The system of claim, 10, wherein said time slot assignment information generating means comprises:

sufficient capacity determining means for determining whether sufficient capacity exists to transmit all of said pending data packets represented in said data traffic matrix during said second frame; and means for extracting data packet information from said data traffic matrix until said data traffic matrix only contains data traffic information for data packets that can be transmitted during said second frame if it is determined that sufficient capacity does not exist.

14. The system of claim 13, in which each frame includes L time slots, wherein said sufficient capacity determining means comprises:

means for determining that sufficient capacity does not exist if L is less than a sum of said active voice calls and said pending data packets.

15. The system of claim 10, in which each frame includes L time slots, wherein said time slot assignment information generating means comprises:

means for scheduling for transmission in $L_c$ of said L time slots said active voice calls represented in said voice traffic matrix;

means for identifying any of said $L_c$, time slots not being used for voice service; and means for scheduling for transmission in $L_p$ of said L time slots and said identified $L_c$ time slots said pending data packets represented in said data traffic matrix, wherein the sum of said $L_c$ land $L_p$ time slots equals said L time slots.

16. The system of claim, 15, wherein said transmitting means comprises:

means for identifying any of said pending data packets not scheduled for transmission in said $L_p$ time slots and said identified $L_c$ time slots; and means for causing the mobile users to buffer said identified data packets.

17. A system of assigning time slots to mobile users in a wireless communication system supporting wireless communication applications where both end users of a communication link are mobile, comprising:

receiving means for receiving time slot reservation requests from the mobile users during a first frame, each of staid time slot reservation requests comprising information identifying a source end user and a destination end user;

matrix generating means for generating during said first frame a voice traffic matrix and a data traffic matrix by using said time slot reservation requests, said voice traffic matrix comprising source end user information and destination end user information for all active voice calls, and said data traffic matrix comprising source end user and destination end user information for all pending data packets;

time slot assignment information generating means for generating, during said first frame, time slot assignment information based on said voice traffic matrix and said dam traffic matrix, wherein said time slot assignment information generating means comprises, means for employing a predetermined scheduling algorithm to generate said time slot assignment information, said predetermined scheduling algorithm supporting fixed length frames, integrated voice and data service, guaranteed voice service, buffering of data packets by the mobile users, and a moveable boundary approach wherein $L_c$ time slots in each frame are reserved for voice service, $L_p$ time slots in each frame are reserved for data service, and any of said $L_c$ time slots not used for voice service may be used for data service; and transmitting means for transmitting, during said first frame, said time slot assignment information to the mobile users:

wherein the mobile users transmit and receive voice packets and data packets during time slots of a second frame as specified by said time slot assignment information.

* * * * *